US010650790B2

(12) United States Patent
Maalouf et al.

(10) Patent No.: US 10,650,790 B2
(45) Date of Patent: May 12, 2020

(54) SYSTEM, APPARATUS, AND METHOD FOR OPTIMIZING VIEWING EXPERIENCE ON AN INTELLIGENT TERMINAL

(71) Applicants: Ramzi Khalil Maalouf, Chevy Chase, MD (US); Jinrong Yang, Chevy Chase, MD (US)

(72) Inventors: Ramzi Khalil Maalouf, Chevy Chase, MD (US); Tao Wang, Shanghai (CN); Xianqi Liu, Shanghai (CN); Shuquan Zhang, Douglaston, NY (US); Chin Hung Lo, Taipei (TW); Jianping Ling, Shanghai (CN); Masumi Aoki, Kyoto (JP); Jinrong Yang, Chevy Chase, MD (US)

(73) Assignees: Ramzi Khalil Maalouf, Chevy Chase, MD (US); Jinrong Yang, Chevy Chase, MD (US)

( * ) Notice: Subject to any disclaimer, the term of this patent is extended or adjusted under 35 U.S.C. 154(b) by 0 days.

(21) Appl. No.: 15/978,640

(22) Filed: May 14, 2018

(65) Prior Publication Data
US 2019/0333479 A1 Oct. 31, 2019

Related U.S. Application Data

(60) Provisional application No. 62/664,587, filed on Apr. 30, 2018.

(51) Int. Cl.
G09G 5/38 (2006.01)
G06F 3/14 (2006.01)
(Continued)

(52) U.S. Cl.
CPC .............. *G09G 5/38* (2013.01); *G06F 3/1454* (2013.01); *G09G 5/14* (2013.01); *G06K 9/00268* (2013.01);
(Continued)

(58) Field of Classification Search
CPC ........................................................ G09G 5/38
See application file for complete search history.

(56) References Cited

U.S. PATENT DOCUMENTS

2003/0122777 A1* 7/2003 Grover ................. G06F 1/1616
345/156
2012/0050331 A1 3/2012 Kanda
(Continued)

OTHER PUBLICATIONS

International Search Report and Written Opinion for International Application No. PCT/US2018/032571 dated Jan. 16, 2019, 14 pages.

*Primary Examiner* — Mark K Zimmerman
*Assistant Examiner* — Jonathan M Cofino
(74) *Attorney, Agent, or Firm* — Dickinson Wright PLLC

(57) ABSTRACT

An intelligent terminal includes unique features and integrated components to provide the ultimate dynamic viewing experience. The intelligent terminal is transportable and can function as a tablet, a laptop, or a desktop. The intelligent terminal is also configured to receive display data from an electronic device, via at least one processor and a network interface. The intelligent terminal includes a display screen that is configured to rotate about an axis that is normal to the display screen and is further configured to modify its display pixel density, brightness, clarity, color, either automatically or in response to a user input. The modified display data, based on the axial orientation of the screen, a display data attribute, the ambient conditions, the user's viewing parameters, and an electronic device attribute, is further configured to generate an image for display on the display screen that provides the most optimal and comfortable dynamic viewing experience.

13 Claims, 17 Drawing Sheets

(51) Int. Cl.
*G09G 5/14* (2006.01)
*G06K 9/00* (2006.01)
(52) U.S. Cl.
CPC . *G09G 2340/0492* (2013.01); *G09G 2354/00* (2013.01)

(56) References Cited

U.S. PATENT DOCUMENTS

| | | | |
|---|---|---|---|
| 2012/0242571 A1* | 9/2012 | Takamura | G09G 5/36 345/156 |
| 2013/0162502 A1 | 6/2013 | Lee et al. | |
| 2014/0129948 A1 | 5/2014 | Jones et al. | |
| 2014/0320624 A1 | 10/2014 | Lee et al. | |
| 2015/0082241 A1 | 3/2015 | Kang et al. | |
| 2017/0262053 A1* | 9/2017 | Noh | G06F 3/013 |
| 2018/0088666 A1* | 3/2018 | Ayoub | G06F 3/013 |
| 2019/0318710 A1* | 10/2019 | Gurr | G06F 3/0346 |

* cited by examiner

SYSTEM, APPARATUS, AND METHOD FOR OPTIMIZING VIEWING EXPERIENCE ON AN INTELLIGENT TERMINAL

CROSS-REFERENCE TO RELATED APPLICATION AND PRIORITY CLAIM

This Application claims priority under 35 U.S.C. § 119(e) to U.S. Provisional Patent Application No. 62/664,587 filed on Apr. 30, 2018. The above-identified provisional patent application is hereby incorporated by reference in its entirety.

TECHNICAL FIELD

This disclosure relates generally to enhancing the viewing experience on a display. More specifically, this disclosure relates to a system, an apparatus, and a method for optimizing the screen orientation and display of an image on an intelligent terminal.

BACKGROUND

The technological advancements of mobile computing devices, also described herein as portable electronic devices, have been greater and more frequent than the technological advancements of image displays on these mobile computing devices. From smart phones to tablets to laptops to desktops, users face increasing frustration as each device's display must be manually calibrated or reconfigured—whenever technologically possible—to suit the varying ambient conditions and user conditions to produce or reproduce (cast) an optimal display image in a manner that the user intuitively expects.

SUMMARY

This disclosure provides apparatus and methods for dynamic display orientation and optimization operations on an intelligent display terminal.

In a first embodiment, an intelligent display terminal is provided. The intelligent display terminal includes a display screen configured to rotate about an axis that is normal to the display screen. The intelligent display terminal also includes at least one processor. The at least one processor is configured to receive, via a network interface, display data from an electronic device. The at least one processor is also configured to modify the display data to form modified display data based on a display data attribute, an electronic device attribute, and an axial orientation of the display screen. The at least one processor is further configured to generate an image for display on the display screen using the modified display data.

In a second embodiment, a method implemented by one or more processors of an intelligent display terminal is provided. The method includes receiving, by the one or more processors, display data from an electronic device via a network interface. The method also includes modifying, by the one or more processors, the display data to form modified display data based on a display data attribute, an electronic device attribute, and an axial orientation of a display screen of the intelligent display terminal. The method further includes generating, by the one or more processors, an image for display on the display screen of the intelligent display terminal using the modified display data.

In a third embodiment, a non-transitory, computer-readable storage medium including one or more executable instruction, that when executed by a processor, causes the processor to receive display data from an electronic device via a network interface, modify the display data to form modified display data based on a display data attribute, an electronic device attribute, and an axial orientation of a display screen of an intelligent display terminal, and generate an image for display on the display screen of the intelligent display terminal using the modified display data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrases "at least one of" and "one or more of" when used with a list of items, means that different combinations of one or more items of the listed items may be used, and only one item in the list may be needed. For example, "at least one of: A, B, and C" and "one or more of A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" and "executable instructions" includes any type of computer code, including source code, object code, and executable code. The phrase "computer readable medium" and "computer readable storage medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory, computer readable storage medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 17, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
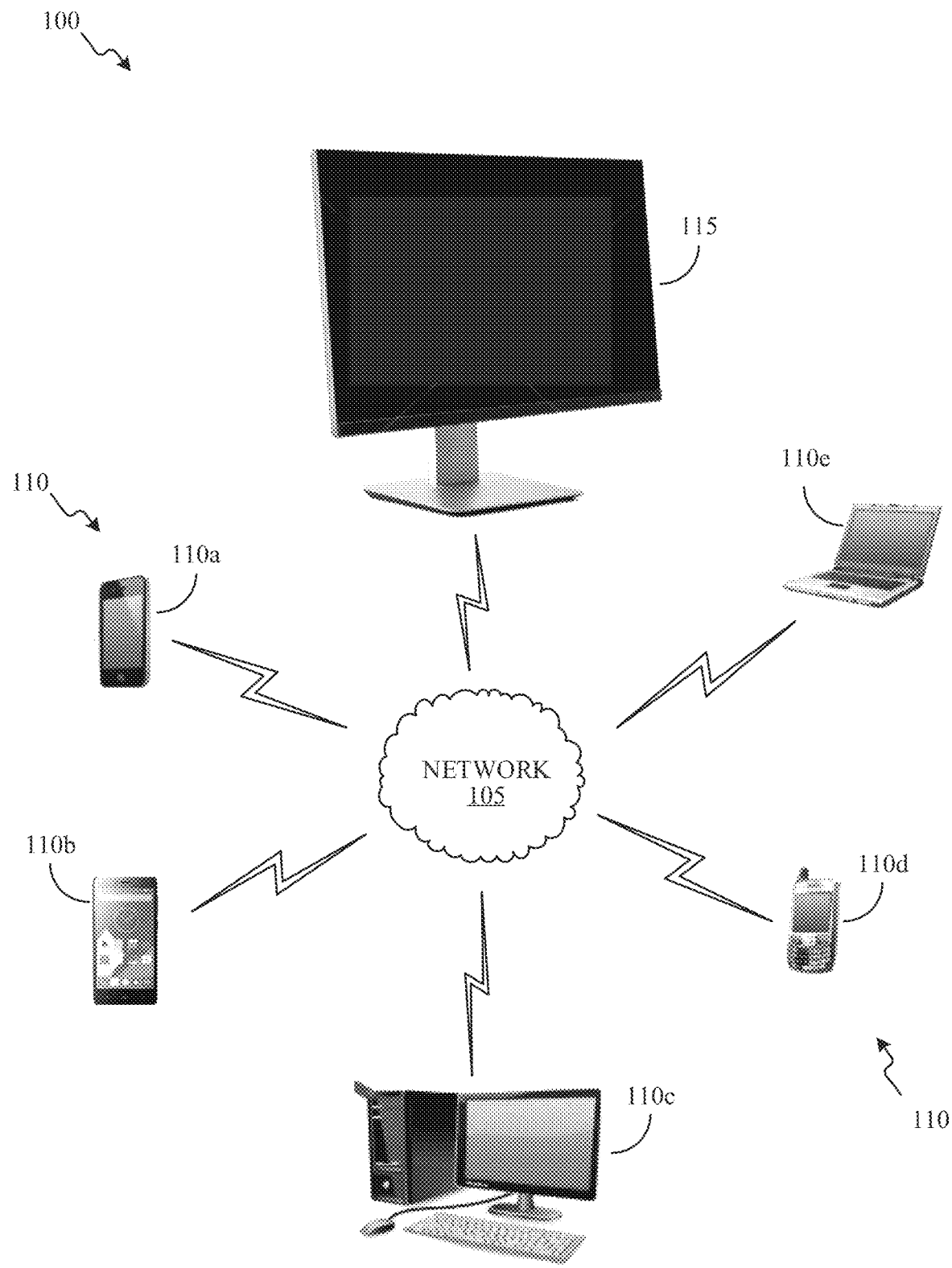
FIG. 1 illustrates a non-limiting, exemplary network context for operating an intelligent display terminal according to certain embodiments of this disclosure.

FIG. 1 illustrates a non-limiting, example network context 100 for operating an intelligent display terminal according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., at an Ethernet connection provided in, for example, a workspace or a home) or over a wireless connection (e.g., a wireless local area network "WLAN" connection or a cellular network). Additionally, or alternatively, one or more constituent networks of the network 105 may include a combination of private networks (such as a local wireless mesh network) and public networks (e.g., a telephone (POTS) network). According to certain embodiments, one or more constituent networks of the network 105 may support multiple communication protocols, including both wireless protocols (e.g., BLUETOOTH™, circuit-switched cellular, 3G, LTE or WiBro) and internet protocols (e.g., HTTP).

The wireless communication may use any of a variety of communications standards, protocols and technologies, including but not limited to Global System for Mobile Communications (GSM), Enhanced Data GSM Environment (EDGE), high-speed downlink packet access (HS-DPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, the network context 100 may, according to certain embodiments, include one or more electronic devices 110 (e.g., smart phone 110a, tablet 110b, desktop computer 110c, mobile handset 110d, laptop computer 110e). The one or more constituent networks of the network 105 provide two-way connectivity between each of the electronic devices 110 and an intelligent display terminal 115. In certain embodiments, the one or more constituent networks of the network 105 provide two-way direct connectivity between the electronic device 110a and the intelligent display terminal 110. For example, one or more constituent networks of the network 105 provide connectivity directly between the electronic device 110a and the intelligent display terminal 115. In certain embodiments, the one or more constituent networks of the network 105 provide two-way indirect connectivity between the electronic device 110a and the electronic device 110e. For example, one or more constituent networks of the network 105 provide connectivity between the electronic device 110a and the electronic device 110e through the intelligent display terminal 115. In certain embodiments, the one or more constituent networks of the network 105 provide two-way connectivity between the electronic device 110 and the intelligent display terminal 115 using one or more same or different channels, protocols, or networks of network 105. For example, a 3G cellular protocol wireless network of network 105 provides connectivity between the electronic device 110a and the intelligent display terminal 115, and a ZIGBEE™ network of the network 105 provides connectivity between the electronic device 110b and the intelligent display terminal 115.

Additionally, the network context 100 include, according to certain embodiments, include the intelligent display terminal 115. As discussed herein, the intelligent display terminal 115 performs one or more intelligent display terminal operations for displaying images on a display terminal. For example, the intelligent display terminal 115 receives display data from an electronic device 110 and modifies the display data to form modified display data. The intelligent display terminal 115 modifies the display data to form modified display data based on a display data attribute, an electronic device attribute, and an axial orientation of the display screen, as discussed herein. The intelligent display terminal 115 generates an image for display on a display screen using the modified display data. The intelligent display terminal 115 may display the image on a display screen of the intelligent display terminal 115. Additionally, or alternatively, the intelligent display terminal 115 may initiate a transmission of the image for display on a projector or on a display screen of another electronic device.

As another example, the intelligent display terminal 115 may divide a display screen into a first section and a second section. The intelligent display terminal 115 receives first display data from a first electronic device 110 and modifies the first display data to form first modified display data. The intelligent display terminal 115 modifies the first display data to form the first modified display data based on a first display data attribute, a first electronic device attribute, and an axial orientation of the display screen, as discussed herein. The intelligent display terminal 115 generates a first image for display on the first section of the display screen using the first modified display data. The intelligent display terminal 115 receives second display data from a second electronic device 110 and modifies the second display data to form second modified display data. The intelligent display terminal 115 modifies the second display data to form the second modified display data based on a second display data attribute, a second electronic device attribute, and an axial orientation of the display screen, as discussed herein. The intelligent display terminal 115 generates a second image for display on the second section of the display screen using the second modified display data. The intelligent display terminal 115 may display the first image on the first section of a display screen of the intelligent display terminal 115 and the second image on the second section of the display screen of the intelligent display terminal 115. Additionally, or alternatively, the intelligent display terminal 115 may initiate a transmission of at least one of the first image or the second image for display on a projector or on a display screen of another electronic device.

In certain embodiments, the intelligent display terminal 115 is transportable and can be easily disengaged from a stand (e.g., stand 210 described herein) via a coupling (e.g., coupling 232 described herein) in one simple step. The intelligent display terminal 115 is lightweight and can be conveniently carried off from a stand and reconnected to another stand at a different location. The intelligent display terminal 115 can also be used without a stand, either in a hand-held state, in a state placed on a desk, or in a state supported via an integrated back easel (e.g., using a clip attachment to a back surface of the intelligent display terminal 115, a side surface of the intelligent display terminal 115, a front surface of the intelligent display terminal 115, a combination thereof, or the like).

The intelligent display terminal 115, with its unique characteristics (e.g., independence, transportability) and communication capabilities, may be configured to have integrated security, home automation, and micro-drones as built-in devices. As an example, the intelligent display terminal 115 may be communicatively or physically coupled to an intelligent electronic personal assistant device (e.g., AMAZON ECHO™, an AMAZON™ device that provides the Alexa intelligent electronic personal assistant). Further description of an intelligent display terminal may be provided in U.S. Pat. No. 9,741,242 issued Aug. 22, 2017 and entitled "A Handheld Terminal with Integrated Wireless Appliance Control" which is incorporated by reference herein in its entirety. As another example, the intelligent display terminal 115 may be integrated with a micro-drone for video applications, security applications, medical applications (e.g., medical emergencies), or the like. Further description of an intelligent display terminal may be provided in U.S. patent application Ser. No. 15/438,711 filed on Feb. 21, 2017 and entitled "Portable Electronic Device with Retractable Antenna Rod for a Camera" which is incorporated by reference herein in its entirety.

Figure 2A:
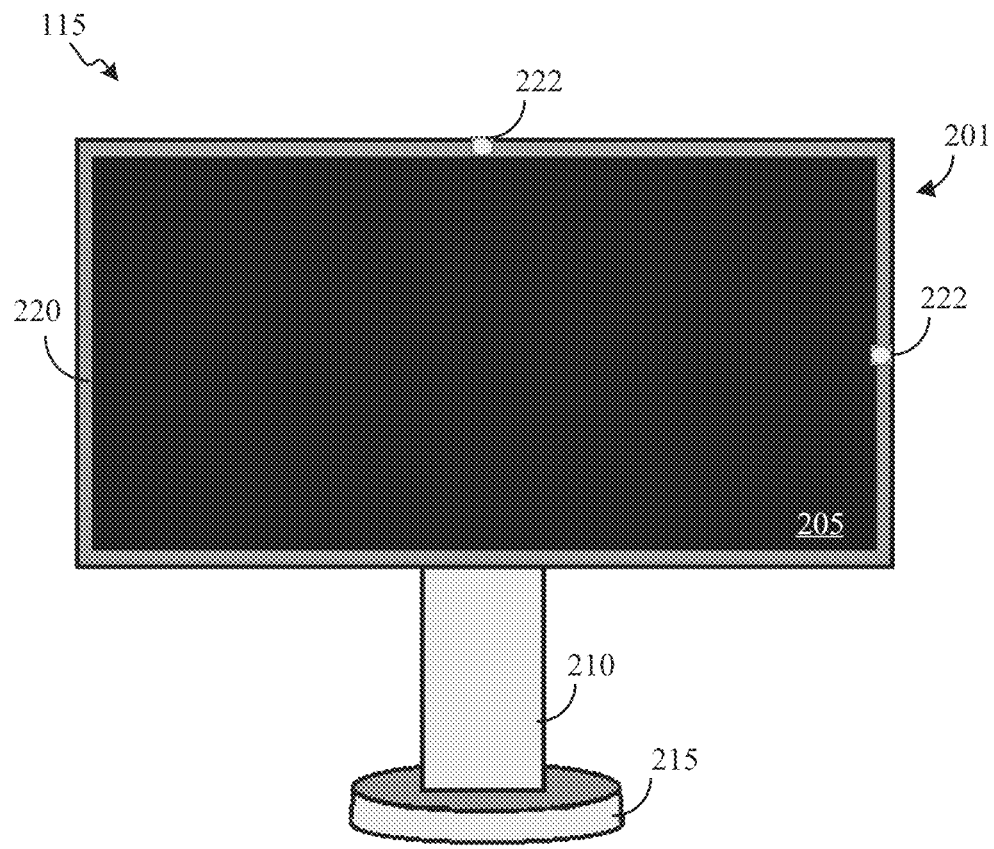
FIG. 2A illustrates a front view of an exemplary embodiment of an intelligent display terminal according to certain embodiments of this disclosure.
Figure 2B:
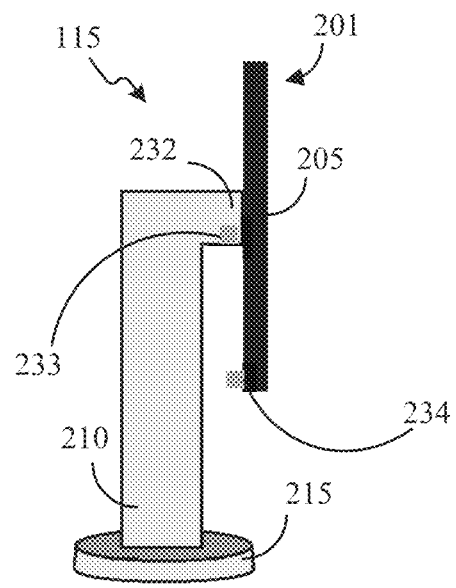
FIG. 2B illustrates a side view of an exemplary embodiment of an intelligent display terminal according to certain embodiments of this disclosure.

FIG. 2A illustrates a front view of an exemplary embodiment of an intelligent display terminal 115 according to certain embodiments of this disclosure. FIG. 2B illustrates a side view of an exemplary embodiment of an intelligent display terminal 115 according to certain embodiments of this disclosure. The intelligent display terminal 115 illustrated in FIGS. 2A and 2B includes a body 201 having display screen 205 surrounded by a bezel 220. The display screen 205 is configured to display still images, videos, interactive images, interactive videos, webpages, programs, streaming content, or the like. The display screen 205 may have a rectangular shape but may alternatively have a different shape (e.g., circular, triangular, oval, symmetrical, asymmetrical). In certain embodiments, the display screen 205 is a touch screen. In certain embodiments, the body 201 does not include the bezel 220.

In certain embodiments, the intelligent display terminal 115 includes a stand 210 supported by a base 215 and attached to the body 201 via a coupling 232. The coupling 232 allows the body 201 to rotate 360 degrees in both a clockwise direction and a counter-clockwise direct about an axis that is normal to a surface of the display screen 205. In certain embodiments, the coupling 232 includes an actuator 233 that rotates the body 201 with respect to the coupling 232 in both the clockwise direction and the counter-clockwise direct about an axis that is normal to a surface of the display screen 205. The actuator 233 may rotate the body 201 in response to receiving a rotation signal. In certain embodiments, the coupling 232 allows the body 201 to pivot so that the display screen 205 is able to face multiple directions without pivoting or moving the stand 210 or the base 215. In certain embodiments, the intelligent display terminal 115 does not include the stand 210 or the base 215 and thus, the body 201 may be coupled to another object (e.g., a wall, a door) via the coupling 232. In certain embodiments, the coupling 232 may be a static coupling and thus, may not allow the body 201 to rotate about an axis that is normal to the surface of the display screen 205. In certain embodiments, the intelligent display terminal 115 does not include the coupling 232 and thus, the body 201 may be free-standing or handheld.

In certain embodiments, the intelligent display terminal 115 also includes one or more optical sensors 222. The one or more optical sensors 222 may be configured to detect viewable features surrounding the intelligent display terminal 115 and capture images surrounding the intelligent display terminal 115 and facing the display screen 205. The optical sensors 222 may be a component of the body 201 and positioned in the bezel 220 or on the display screen 205. Additionally, or alternatively, the optical sensors 222 may be a component of the stand 210 or the base 215. In certain embodiments, one or more optical sensors 222 face a direction that is substantially normal to a surface of the display screen 205 to capture images or detect an amount of light in a space from which the display screen 205 can be viewed.

In certain embodiments, at least one optical sensor 222 may be a camera. The camera may capture images or videos of viewers of the display screen 205 to identify facial features of each of the viewers or a distance between each of the viewers and the intelligent display terminal 115. The camera may also measure an amount of light or a brightness in an environment surrounding the display screen 205 or in a space from which the display screen 205 can be viewed. In certain embodiments, at least one optical sensor 222 may be a brightness sensor. The brightness sensor may be used to determine an amount of light or a brightness in an environment surrounding the display screen 205 or in a space from which the display screen 205 can be viewed.

In certain embodiments, the intelligent display terminal 115 also includes one or more speakers 234. The speakers 234 are configured to produce sound to be heard by a user or a viewer of the intelligent display terminal 115. The speakers 234 may be a component of the body 201 and positioned on one or more surfaces of the body 201 (e.g., the bezel 220, a side surface of the body 201, a top or bottom surface of the body 201, or a surface of the body 201 opposite the display screen 205). Additionally, or alternatively, the speakers 234 may be a component of the stand 210 or the base 215 and positioned on one or more of the surfaces thereof. The speakers 234 may produce sound independently or in conjunction with a display on the display screen 205.

Figure 3:
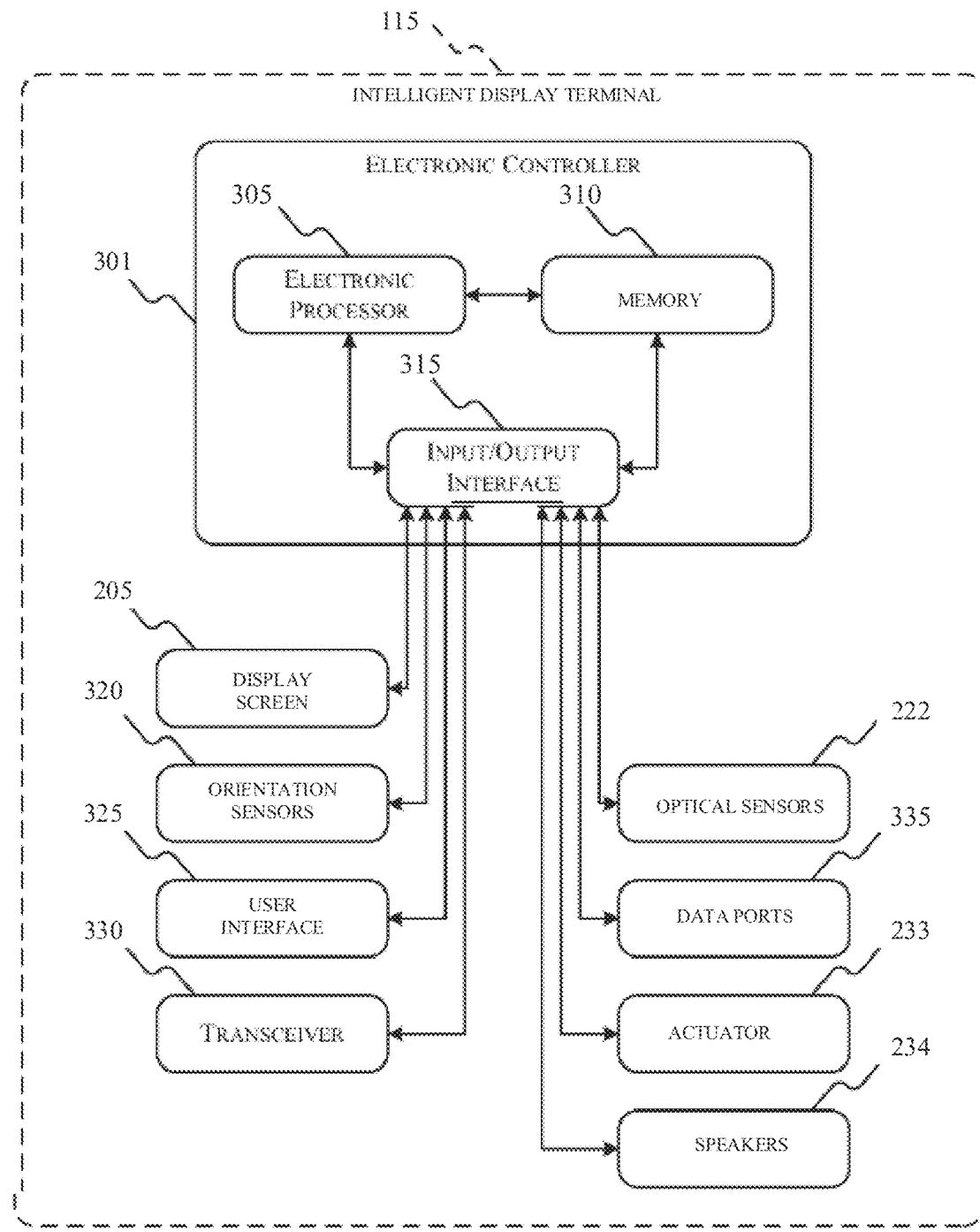
FIG. 3 illustrates a diagram of one exemplary embodiment of the components included in an intelligent display terminal according to certain embodiments of this disclosure.

FIG. 3 is a diagram of one exemplary embodiment of the components included in the intelligent display terminal 115 according to certain embodiments of this disclosure. In the embodiment illustrated, the intelligent display terminal 115 includes an electronic controller 301, the display screen 205, an orientation sensor 320, a user interface 325, a transceiver 330, the one or more optical sensors 222, one or more data ports 335, the actuator 233, and the one or more speakers 234.

The electronic controller 301 includes, among other things, an electronic processor 305 (e.g., a microprocessor), a memory 310, an input/output interface 315, and a bus. The bus connects various components of the electronic controller 301 including the memory 310 to the electronic processor 305. The memory 310 includes read only memory (ROM), random access memory (RAM), an electrically erasable programmable read-only memory (EEPROM), other non-transitory computer-readable media, a combination thereof, or the like.

The electronic processor 305 is also configured to retrieve program instructions and data from the memory 310 and execute, among other things, instructions to perform intelligent display terminal operations, as described herein. Additionally or alternatively, the memory 310 is included in the electronic processor 305. The input/output interface 315 includes routines for transferring information between components within the electronic controller 301 and other components that are internal and external to the intelligent display terminal 115. As illustrated in FIG. 3, the input/output interface 315 communicatively couples the electronic processor 305 and the memory 310 of the electronic controller 301 with each of the display screen 205, the orientation sensor 320, the user interface 325, the transceiver 330, the one or more optical sensors 222, the one or more data ports 335, an actuator 233, and the one or more speakers 234. In certain embodiments, the electronic controller 301 includes processing circuitry for implementing one or more intelligent display terminal operations, as described herein.

The display screen 205 is configured to display still images, moving images (e.g., videos), interactive images, webpages, programs, streaming content, or the like. The display screen 205 may be used to display one or more images generated based on display data received from electronic device 110 and modifies by the electronic controller 301 the intelligent display terminal 115. In certain embodiments, when the display screen 205 is a touchscreen, the display screen 205 may be configured to receive a tracing touch input defining a perimeter around a section of the display screen 205. The tracing touch input received by the display screen 205 may be detected by the electronic controller 301 and used to identify a section of the display screen for displaying an image generated using modified display data.

When the display screen 205 is a touchscreen or a touch-sensitive display, the display screen 205 provides an input interface and an output interface between the intelligent display terminal 115 and an electronic device 110. A display controller may receive or send electrical signals from/to the display screen 205. The display screen 205 displays visual output to the user. The visual output may include graphics, text, icons, video, and any combination thereof (collectively termed "graphics"). In some embodiments, some or all of the visual output may correspond to user-interface objects.

When the display screen 205 is a touchscreen, the display screen 205 has a touch-sensitive surface, sensor or set of sensors that accepts input from the user based on haptic and/or tactile contact. The display screen 205 and the display controller (along with any associated modules and/or sets of instructions in a memory) detect contact (and any movement or breaking of the contact) on display screen 205 and converts the detected contact into interaction with user-interface objects (e.g., one or more soft keys, icons, web pages or images) that are displayed on display screen 205. In an exemplary embodiment, a point of contact between display screen and a user corresponds to a finger of the user.

When the display screen 205 is a touchscreen, the display screen 205 may use LCD (liquid crystal display) technology, LPD (light emitting polymer display) technology, or LED (light emitting diode) technology, although other display technologies may be used in other embodiments. The display screen 205 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with the display screen 205. In an exemplary embodiment, projected mutual capacitance sensing technology is used, such as that found in the iPhone®, iPod Touch®, and iPad® from Apple Inc. of Cupertino, Calif.

The user may make contact with the display screen 205 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the display screen 205, intelligent display terminal 115 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the display screen 205 or an extension of the touch-sensitive surface formed by the touch screen.

The orientation sensor 320 is configured to determine the direction of gravitation pull relative to the body 201 to maintain an image in an upright or constant orientation on the display screen 205 with respect to gravity. The orientation sensor 320 may maintain the image in an upright or constant orientation on the display screen 205 with respect to gravity regardless how much the body 201 and the display screen 205 rotate about an axis to. For example, the display screen 205 displays an image in an upright position relative to the direction of gravity. The body 201 may rotate about an axis that is normal to the surface of the display screen 205 while the display screen 205 displays the image. In response to the rotation of the body 201, the orientation sensor 320 determines that the direction of the gravitational pull relative to the body 201 has changed by 90 degrees. The orientation sensor 320 transmits a signal indicating that the direction of the gravitational pull relative to the body 201 has changed by 90 degrees in a clockwise direction. In response to receiving the signal indicating that the direction of the gravitational pull relative body has changed by 90 degrees in the clockwise direction, the electronic controller 301 rotates the image displayed on the display screen 205 90 degrees in the clockwise direction so that the image displayed on the display screen 205 remains in an upright position.

In some embodiments, the one or more orientation sensors 320 include one or more accelerometers (e.g., one or more linear accelerometers and/or one or more rotational accelerometers). In certain embodiments, the one or more orientation sensors 320 include one or more gyroscopes. In certain embodiments, the one or more orientation sensors 320 include one or more magnetometers. In certain embodiments, the one or more orientation sensors 320 include one or more of global positioning system (GPS), Global Navigation Satellite System (GLONASS), or other global navigation system receivers. The GPS, GLONASS, or other global navigation system receivers may be used for obtaining information concerning the location and orientation (e.g., portrait/vertical or landscape/horizontal) of display screen 205. In some embodiments, the one or more orientation sensors 320 include any combination of orientation/rotation sensors. FIG. 3 shows the one or more orientation sensors 320 coupled to the input/output interface 315. In certain embodiments, information is displayed on the display screen 205 in a portrait view (e.g., vertical orientation) or a landscape view (e.g., horizontal orientation) based on an analysis of data received from the one or more orientation sensors 320.

The user interface 325 can include any combination of digital and analog input devices required to achieve a desired level of control of the intelligent display terminal 115. For example, the user interface 325 includes a display, a camera, a speaker, a plurality of knobs, dials, switches, buttons, or the like. In some embodiments, the user interface 325 includes a touch-sensitive interface (e.g., a touch-screen display) that displays visual output generated by software applications executed by the electronic processor 305. Visual output includes, for example, graphical indicators, lights, colors, text, images, graphical user interfaces (GUis), combinations of the foregoing, or the like. The touch-sensitive interface includes a suitable display mechanism for displaying the visual output (e.g., a light-emitting diode (LED) screen, a liquid crystal display (LCD) screen). The touch-sensitive interface also receives user input using detected physical contact (e.g., detected capacitance or resistance). Based on the user input, the touch-sensitive interface outputs signals to the electronic processor 305 which indicate positions on the touch-sensitive interface currently being selected by physical contact.

The user interface 325 may be incorporated into the display screen 205 as a display. For example, the user interface 325 may be incorporated into the display screen 205 as a display when the display screen 205 is a touch screen. Additionally, or alternatively, the user interface 325 may be an interface that is separate from the display screen 205 and located on a surface of the body 201, the stand 210, or the base 215. In certain embodiments, the user interface 325 is located on a remote device or an electronic device 110 (e.g., on a display screen of the electronic device 110). The remote device or the electronic device 110 may receive an input through the user interface 325 and transmit the input to the electronic controller 301 via a network interface or the transceiver 330 described herein.

The user interface 325 is configured to receive and transmit data to the electronic controller 301 for processing or to the memory 310 for storage. In certain embodiments, the user interface 325 is configured to receive presentation inputs to change or adjust one or more visual output variables or audio output variables associated with the intelligent display terminal 115. For example, the user interface 325 may receive one or more presentation inputs from a viewer of the display screen 205 to change an image brightness, an image contrast, an image hue, an image clarity, an image color, an image size, an image shape, a horizontal image pixel density of an image, a vertical image pixel density of an image, an image orientation on a display screen, or an image placement on a display screen. The user interface 325 may receive the one or more presentation inputs and transmit the one or more presentation inputs to the electronic controller 301 for processing by the electronic processor 305 or for storing in the memory 310. In certain embodiments, the user interface 325 may be used to change a sound volume from the one or more speakers 234 or to initiate the actuator 233 to rotate the body 201, as described herein.

The user interface 325 is configured to display information processed by the electronic controller 301 or stored in the memory 310. In certain embodiments, the user interface 325 is configured to display presentation output set-points or presentation output parameters associated with the intelligent display terminal 115. For example, the user interface 325 may access display presentation output set-points or presentation output parameters from the electronic processor 305 or from the memory 310. The user interface 325 may display the presentation output set-points or presentation output parameters for a viewer of the display screen to view a value of an image brightness, a value of an image contrast, a value of an image hue, a value of an image clarity, a value of an image color, a value of an image size, an image shape, a value of a horizontal image pixel density of an image, a value of a vertical image pixel density of an image, an image orientation on a display screen, or an image placement on a display screen. In certain embodiments, the user interface 325 may be used to view a value of a sound volume from the one or more speakers 234 or to view a rotation angle of the body 201, as described herein.

The transceiver 330 is configured to provide communications between the intelligent display terminal 115 (e.g., the electronic controller 301 of the intelligent display terminal 115) and one or more of the electronic devices 110 via the network context 100. The transceiver 330 transmits signals to one or more communication networks and receives signals from the communication networks. In some embodiments, signals include, for example, data, data packets, a combination thereof, or the like. In some embodiments, the transceiver 330 includes separate transmitters and receivers. The communication network may be implemented using various networks, for example, a cellular network, the Internet, a BLUETOOTH™ network, a wireless local area network (e.g., Wi-Fi), a wireless accessory Personal Area Networks (PAN), cable, an Ethernet network, satellite, a machine-to-machine (M2M) autonomous network, a public switched telephone network, a combination thereof, or the like. In certain embodiments, the transceiver 330 is a component of the network interface described herein.

The transceiver 330 may be configured to receive data from one or more components of the network context 100. In certain embodiments, the transceiver 330 is configured to receive display data for modification thereof and to perform one or more intelligent display terminal operations, as described herein. For example, the transceiver 330 receives display data for a video stream from the electronic device 110 so that the electronic controller 301 can modify the display data to form modified display data of the video stream based on a display data attribute, an electronic device attribute, and an axial orientation of the display screen. The modified display data may be used to display enhanced streaming video having an improved viewing experience. As another example, the transceiver 330 receives display data for an image from the electronic device 110 so that the electronic controller 301 can modify the display data to form modified display data of the image based on a display data attribute, an electronic device attribute, and an axial orientation of the display screen. The modified display data may be used to display an enhanced image having an improved viewing experience. In certain embodiments, the transceiver 330 is configured to receive audio data from an electronic device 110 to provide sound via the one or more speakers 234 either independently or in conjunction with a still image or video.

In certain embodiments, the transceiver 330 is configured to receive orientation data indicating a physical orientation of electronic device display screen. For example, the transceiver 330 receives orientation data indicating that the electronic device display screen has been rotated 90 degrees changing a display of an image on the electronic device display screen. The orientation data may be used by the electronic controller 301 to generate a rotation signal to command the actuator 233 to rotate the display screen 205 in accordance with the orientation of the electronic device display screen.

The transceiver 330 may be configured to transmit data to one or more components of the network context 100. In certain embodiments, the transceiver 330 is configured to transmit a still image or video generated using modified display data formed by the electronic controller 301. For example, the electronic controller 301 may have generated an image using modified display data. The electronic controller 301 may transmit the image to the display screen 205. In addition, the electronic controller may transmit the image, using the transceiver 330, to one or more electronic devices 110 in communication with the transceiver 330. Thus, both the display screen 205 of the intelligent display terminal 115 and a display screen of one or more electronic devices 110 in communication with the network 105 may display the image generated using the modified display data.

In certain embodiments, the transceiver 330 is configured to transmit an input signal to the electronic device 110 within the network 105. An input signal comprises a signal generated by the electronic controller 301 based on a detected touch input at a selectable location of an image on a display screen 205. For example, the display screen 205 may be a touchscreen. The electronic controller 301 may have received display data from an electronic device 110 via the network 105. The electronic controller 301 may have modified the display data from the electronic device to form modified display data. Using the modified display data, the electronic controller 301 may have generated an image for display on the display screen 205. The generated image for display on the display screen 205 may have included a selectable location. When the selectable location is touched, the electronic controller 301 detects a touch input and generates an input signal for transmission to the electronic device 110. The transceiver 330 transmits the input signal to the electronic device 110 so that the electronic device 110 performs one or more functions associated with the touch input at the selectable location of the image. Images and displays associated with the function may be transmitted back to the intelligent display terminal 115 as display data so that the electronic controller 301 may modify the display data to form modified display data for generating an image for display on the display screen 205.

The one or more optical sensors 222 are configured to detect viewable features surrounding the intelligent display terminal 115 and capture images surrounding the intelligent display terminal 115 and facing the display screen 205. The optical sensors 222 may include charge-coupled device (CCD) or complementary metal-oxide semiconductor (CMOS) phototransistors. The optical sensors 222 receive light from the environment, projected through one or more lens, and convert the light to data representing an image. In conjunction with an imaging module or a camera module, for example, the optical sensors 222 may capture still images or video. In some embodiments, an optical sensor is located on the back of the intelligent display terminal 115, opposite display screen 205 on the front of the intelligent display terminal 115, so that the display screen 205 may be used as a viewfinder for still and/or video image acquisition. In some embodiments, another optical sensor is located on the front of the intelligent display terminal 115 so that the user's image may be obtained for videoconferencing while the user views the other video conference participants on the display screen 205.

In certain embodiments, the optical sensors 222 may include cameras and brightness sensors. The camera may capture images or videos of viewers of the display screen 205 to identify facial features of each of the viewers or a distance between each of the viewers and the intelligent display terminal 115. The camera or the brightness sensors may be used to measure a brightness in an environment surrounding the display screen 205.

The one or more data ports 335 provide a physical connection for wired communication with the electronic controller 301. In certain embodiments, in addition to or as an alternative to using the transceiver 330, the electronic controller 301 receives and transmits data with one or more of the electronic devices 110 through the data port 335 and a wired communication line. For example, using the data port 335 and a wired communication line, the electronic controller 301 receives display data or an orientation signal and transmits an image generated using modified display data or an input signal, as described herein. In certain embodiments, the transceiver 330 is a component of the network interface described herein.

The actuator 233 is configured to rotate the body 201 and the display screen 205 about an axis that is normal to the display screen 205. For example, the intelligent display terminal 115 includes the stand 210 supported by the base 215 and attached to the body 201 having the display screen 205 via the coupling 232. The coupling 232 allows the body 201 to rotate 360 degrees in both a clockwise direction and a counter-clockwise direct about an axis that is normal to a surface of the display screen 205. In response to receiving a rotation signal from the electronic controller 301, the actuator 233 drives the rotation of the body 201 and the display screen 205 about the axis. In certain embodiments, the actuator 233 drives the rotation of the body 201 and the display screen 205 with respect to the coupling 232 or the stand 210 and base 215 in both the clockwise direction and the counter-clockwise direction about an axis that is normal to a surface of the display screen 205. In certain embodiments, the intelligent display terminal 115 does not include the actuator 233 and thus, the body 201 and the display screen 205 may be manually rotated in both the clockwise direction and the counter-clockwise direction about an axis that is normal to the surface of the display screen 205.

The one or more speakers 234 are configured to produce sound to be heard by a user or a viewer of the intelligent display terminal 115. The speakers 234 may be a component of the body 201 and positioned on one or more surfaces of the body 201 (e.g., the bezel 220, a side surface of the body 201, a top or bottom surface of the body 201, or a surface of the body 201 opposite the display screen 205). Additionally, or alternatively, the speakers 234 may be a component of the stand 210 or the base 215 and positioned on one or more of the surfaces thereof. The speakers 234 may produce sound independently or in conjunction with a display on the display screen 205. In certain embodiments, the intelligent display terminal 115 does not include the one or more speakers 234 and thus, when the electronic controller 301 receives audio data, the electronic controller 301 transmits the audio data to one or more remote speakers via the transceiver 330 or the one or more data ports 335.

The electronic controller 301, performing one or more intelligent display terminal operations, receives, via a network interface, display data from an electronic device 110. The display data is used to generate an original image on an electronic device display screen. The original image includes an original image size, an original horizontal image pixel density, an original vertical image pixel density, an original image orientation, an original image brightness, an original image clarity, an original image color, an original image hue, an original image placement on an electronic device display screen, or the like. It should be understood that the term "image" includes both a still image and a moving image (e.g., a video).

The electronic controller 301 may receive, via the network interface, display data from an electronic device 110 using one or more communication mediums of the network 105. For example, the electronic controller 301 may receive, via the network interface, display data from an electronic device 110 using one or more of nearfield communication (NFC) (e.g., BLUETOOTH™, ZIGBEE™), circuit-switched cellular, 3G, LTE, WiBro, WLAN, a private network, public networks (e.g., a telephone (POTS) network), internet protocols (e.g., HTTP), wired communication, other communication mediums identified herein, a combination thereof, or the like. Electronic devices 110 may include smart phones, tablets, desktop computers, mobile handsets, laptop computers, or the like.

The electronic controller 301, performing one or more intelligent display terminal operations, modifies the display data to form modified display data based on a display data attribute, an electronic device attribute, and an axial orientation of the display screen. For example, the electronic controller 301 may have received display data from electronic device 110 via a network interface. The electronic controller 301 may determine that the display data attributes of the display data include that the display data produces a video, accompanies audio data, and has a WINDOWS MEDIA PLAYER™ data format. The electronic controller 301 may also determine that the electronic device 110 providing the display data to the electronic controller 301 is iPhone™ from APPLE™ and is utilizing LTE to communicate the display data to the electronic controller 301. The electronic controller 301 may further determine that the display screen 205 is in a horizontal viewing orientation. Based on the display data attributes, the electronic device attributes, and the axial orientation of the display screen 205, the electronic controller 301 modifies the display data to form modified display data.

In certain embodiments, the electronic controller 301 modifies the display data based on one or more display data attributes including display data presentation characteristics or display data types. For example, the electronic controller 301 modifies the display data based on one or more display data presentation characteristics such as an image produced by the display data, a streamed video produced by the display data (e.g., streamed by the electronic device 110), a webpage display produced by the display data, an interactive display produced by the display data (e.g., having selectable areas), a program or program type having a display produced by the display data (e.g., a word processing application, a spreadsheet application, a telephone application, an instant messaging application, a photo display application, a video display application, a digital camera display application, a digital video camera application, a web creation application, a drawing application, a presentation application, a website creation application, a disk authoring application, a gaming application, a digital music player, an email application, a video conferencing application, a contacts application, a map or mapping application), an image produced by the display data that also has audio component, an image size of the image produced by the display data, a horizontal image pixel density of the image produced by the display data, a vertical image pixel density of the image produced by the display data, an orientation of the image produced by the display data, a brightness of the image produced by the display data, a clarity of the image produced by the display data, a color of the image produced by the display data, a hue of the image produced by the display data, a placement of the image produced by the display data on the electronic device display screen, or the like. As another example, the electronic controller 301 modifies the display data based on one or more display data types such as an image display data format, a program display data format, a webpage display data format, a streaming display data, a display data format coupled with an audio data format, display data of a particular program, display data of a particular image, particular streaming display data, or display data having a user selected priority.

In certain embodiments, the electronic controller 301 modifies the display data based on one or more display electronic device attributes. For example, the electronic controller 301 modifies the display data based on one or more of an electronic device type providing the display data, an electronic device orientation, one or more operating capabilities of the electronic device 110 providing the display data, a distance between the electronic device 110 and the intelligent display terminal 115, an electronic device communication medium with the network interface, or the like.

In certain embodiments, the electronic controller 301 modifies the display data based on an axial orientation of the display screen 205. For example, the electronic controller 301 modifies the display data based on one or more of an upright orientation of the display screen 205, a horizontal orientation of the display screen 205, an angled orientation of the display screen 205, an angle in degrees between zero and 360 of the display screen 205, or the like. In certain embodiments, the electronic controller 301 modifies the display data based on a configuration ratio of the display screen 205, a configuration ratio of a display screen section of the display screen 205, a dimension of the display screen 205, a dimension of a display screen section of the display screen 205, a capability of the display screen 205, or the like.

Figure 4:
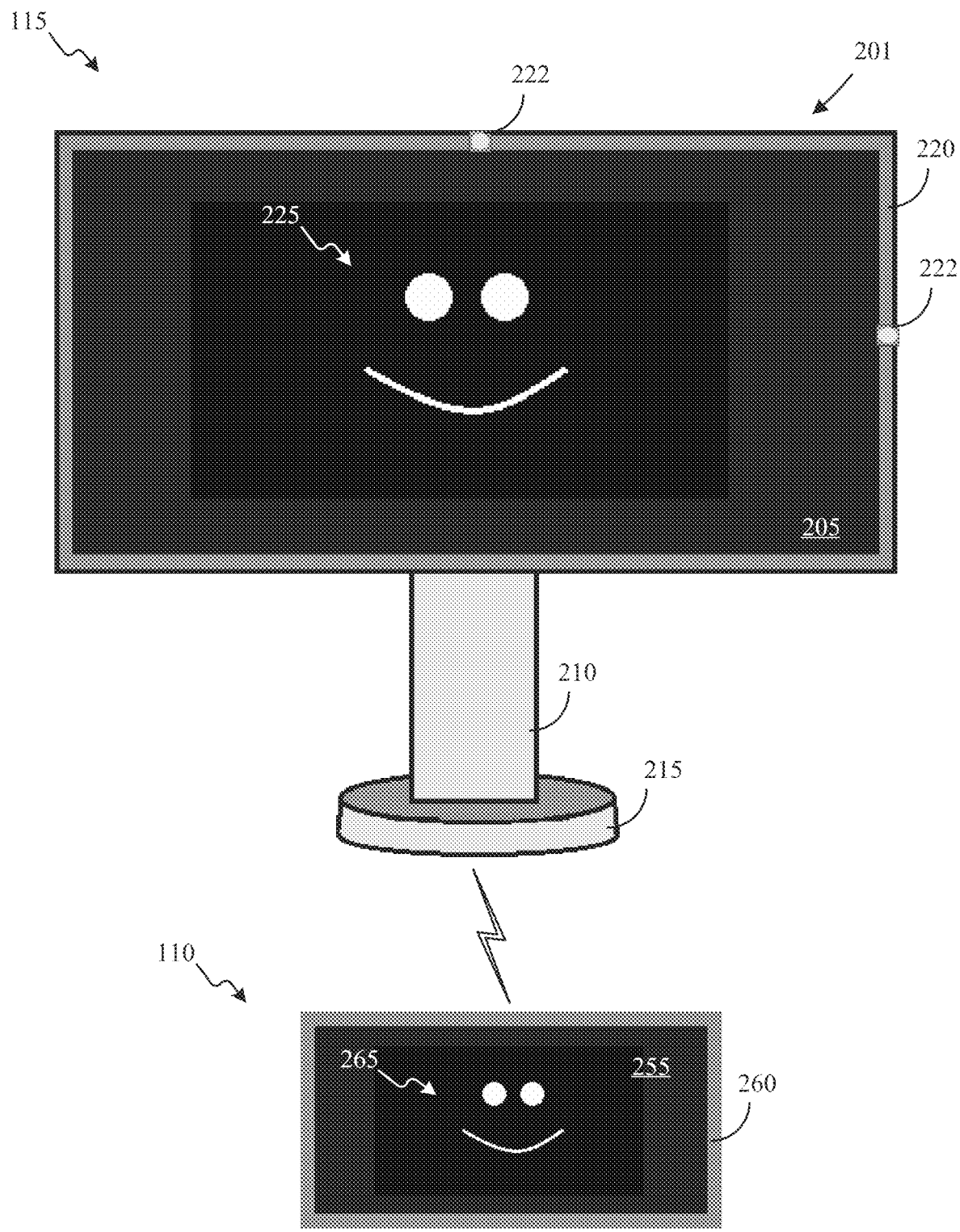
FIGS. 4, 5, 6, 7, 8, 9, 10, 11, 12, 13, and 14 are diagrams of other exemplary embodiments of operating an intelligent display terminal according to certain embodiments of this disclosure.

FIG. 4 is another diagram of an exemplary embodiment of operating an intelligent display terminal according to certain embodiments of this disclosure. As illustrated in FIG. 4, the intelligent display terminal 115 includes the body 201, the display screen 205 surrounded by the bezel 220, and the one or more optical sensors 222. The body 201 is coupled to the stand 210 supported by the base 215. The display screen 205 is positioned in a horizontal orientation. The electronic device 110 includes an electronic device display screen 255 surrounded by a bezel 260. The electronic device display screen 255 is also positioned in a horizontal orientation. The electronic device display screen 255 may display an image 265. The electronic controller 301 of the intelligent display terminal 115 may receive display data from the electronic device 110 indicative of the image 265. The display data from the electronic device 110 may also include an indication that the electronic device 110 is positioned in the horizontal orientation. The electronic controller 301 after receiving the display data may modify the display data based on the horizontal orientation of the display screen 205 and the horizontal orientation of the electronic device display screen 255 to generate an image 225 on the display screen 205.

Figure 5:
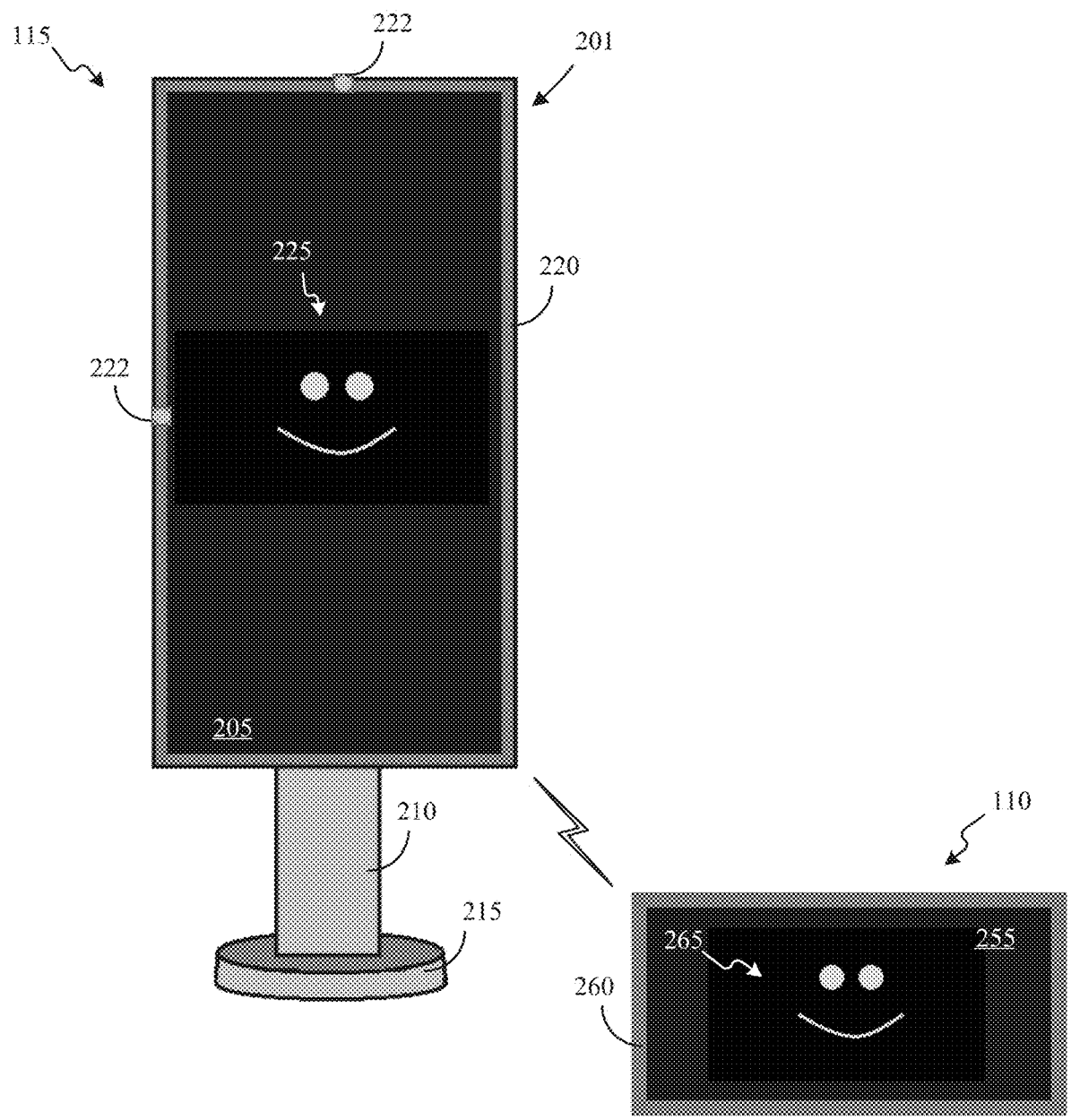

FIG. 5 is another diagram of an exemplary embodiment of operating an intelligent display terminal according to certain embodiments of this disclosure. As illustrated in FIG. 5, the intelligent display terminal 115 includes the body 201, the display screen 205 surrounded by the bezel 220, and the one or more optical sensors 222. The body 201 is coupled to the stand 210 supported by the base 215. The display screen 205 is positioned in a vertical orientation. The electronic device 110 includes the electronic device display screen 255 surrounded by the bezel 260. The electronic device display screen 255 is positioned in a horizontal orientation. The electronic device display screen 255 may display the image 265. The electronic controller 301 of the intelligent display terminal 115 may receive display data from the electronic device 110 indicative of the image 265. The display data from the electronic device 110 may also include an indication that the electronic device 110 is positioned in the horizontal orientation. The electronic controller 301 after receiving the display data may modify the display data based on the vertical orientation of the display screen 205 and the horizontal orientation of the electronic device display screen 255 to generate the image 225 on the display screen 205.

Figure 6:
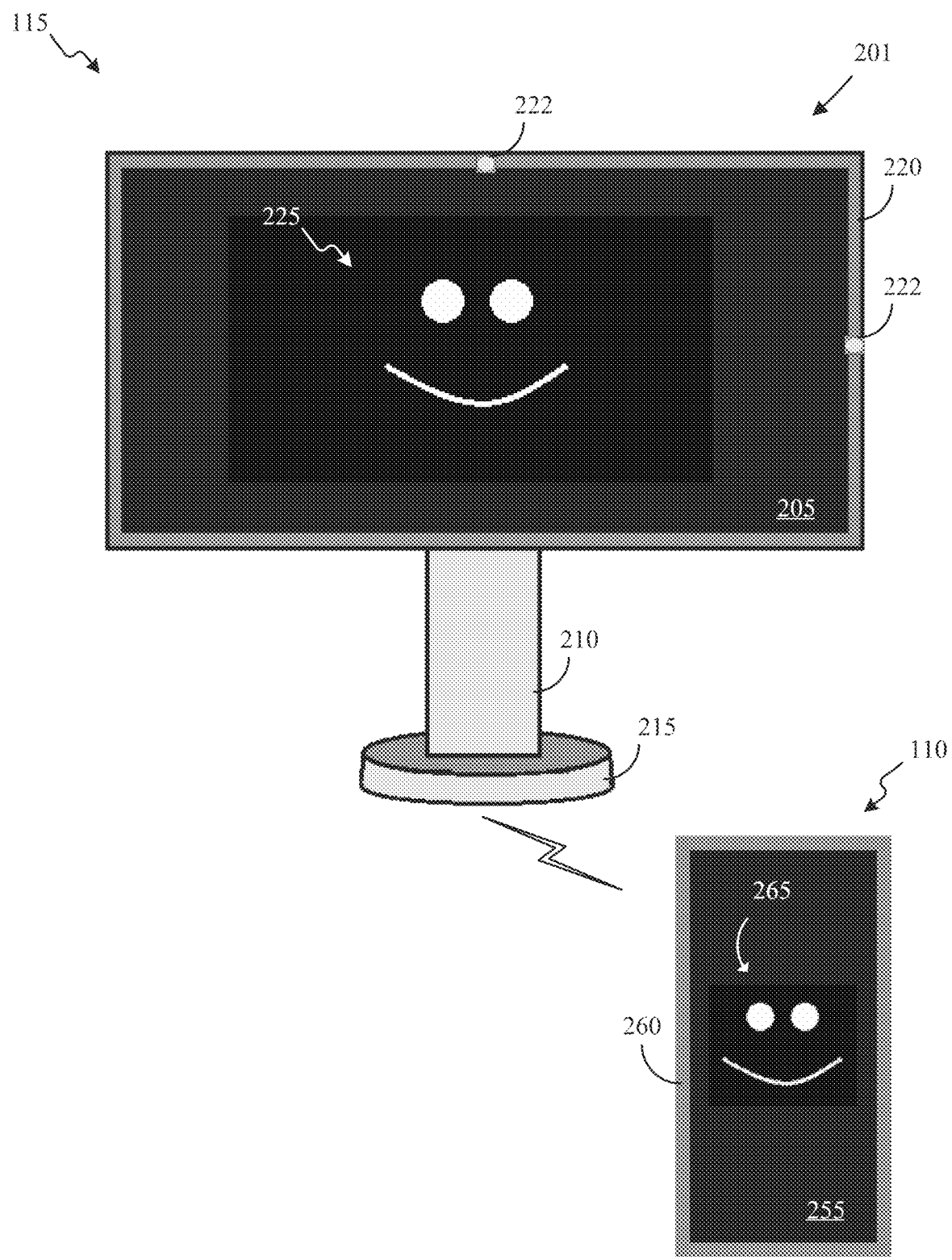

FIG. 6 is another diagram of an exemplary embodiment of operating an intelligent display terminal according to certain embodiments of this disclosure. As illustrated in FIG. 6, the intelligent display terminal 115 includes the body 201, the display screen 205 surrounded by the bezel 220, and the one or more optical sensors 222. The body 201 is coupled to the stand 210 supported by the base 215. The display screen 205 is positioned in a horizontal orientation. The electronic device 110 includes the electronic device display screen 255 surrounded by the bezel 260. The electronic device display screen 255 is positioned in a vertical orientation. The electronic device display screen 255 may display the image 265. The electronic controller 301 of the intelligent display terminal 115 may receive display data from the electronic device 110 indicative of the image 265. The display data from the electronic device 110 may also include an indication that the electronic device 110 is positioned in the vertical orientation. The electronic controller 301 after receiving the display data may modify the display data based on the horizontal orientation of the display screen 205 and the vertical orientation of the electronic device display screen 255 to generate the image 225 on the display screen 205.

Figure 7:
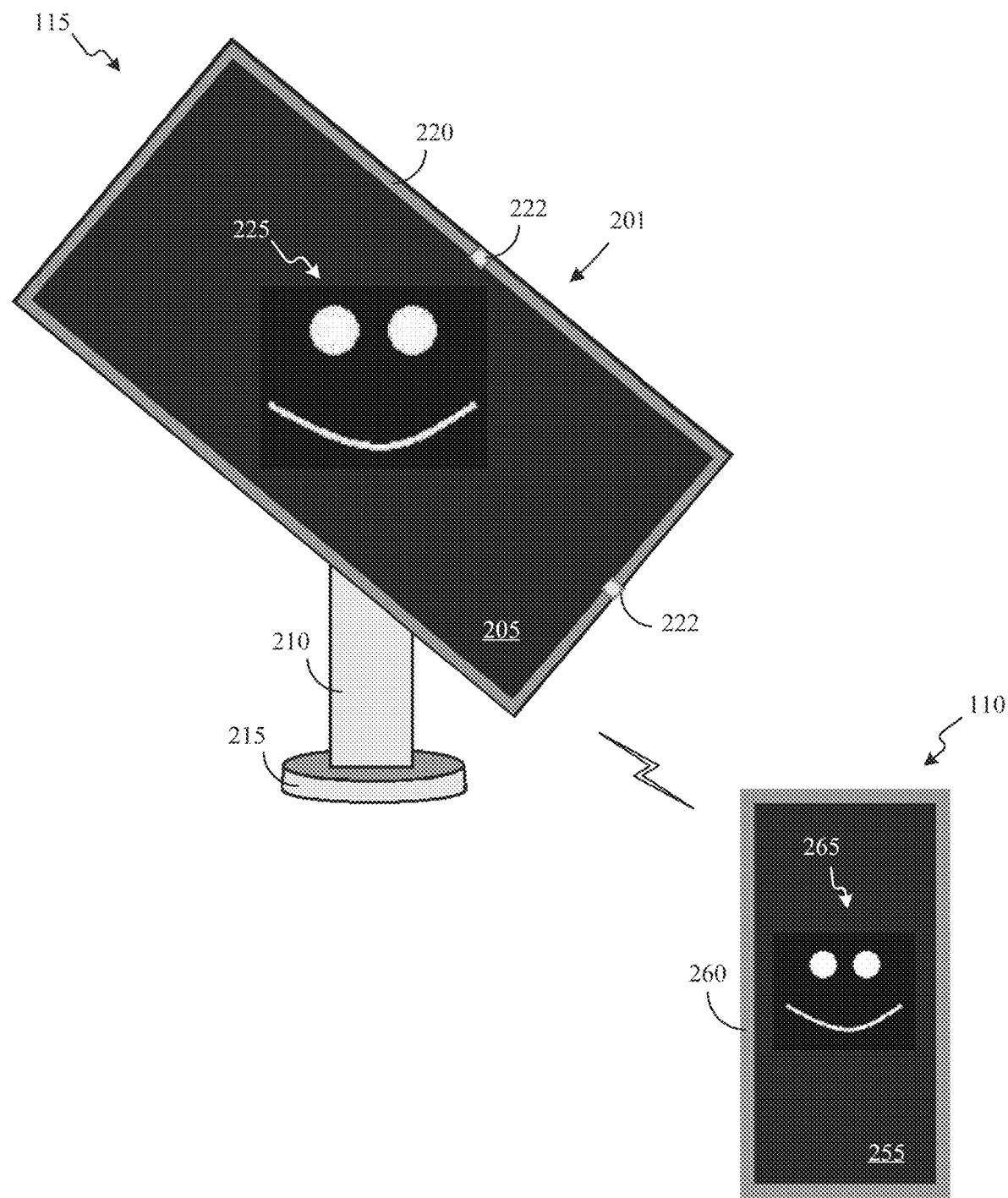

FIG. 7 is another diagram of an exemplary embodiment of operating an intelligent display terminal according to certain embodiments of this disclosure. As illustrated in FIG. 7, the intelligent display terminal 115 includes the body 201, the display screen 205 surrounded by the bezel 220, and the one or more optical sensors 222. The body 201 is coupled to the stand 210 supported by the base 215. The display screen 205 is positioned in an angled orientation. The electronic device 110 includes the electronic device display screen 255 surrounded by the bezel 260. The electronic device display screen 255 is positioned in a vertical orientation. The electronic device display screen 255 may display the image 265. The electronic controller 301 of the intelligent display terminal 115 may receive display data from the electronic device 110 indicative of the image 265. The display data from the electronic device 110 may also include an indication that the electronic device 110 is positioned in the vertical orientation. The electronic controller 301 after receiving the display data may modify the display data based on the angled orientation of the display screen 205 and the vertical orientation of the electronic device display screen 255 to generate the image 225 on the display screen 205.

In certain embodiments, the electronic controller 301, performing one or more intelligent display terminal operations, modifies the display data to form the modified display data based on one or more facial features of viewers viewing the display screen 205. For example, the intelligent display terminal 115 includes one or more optical sensors 222. At least one of those optical sensors 222 is a camera. The electronic controller 301 may use the camera to detect squinting or straining eyes of one or more viewers viewing a display screen 205. Based on detecting squinting or straining eyes of one or more of the viewers viewing the display screen 205, the electronic controller 301 may modify the display data to form the modified display data in order to ease the strain of the eyes of the one or more viewers.

In certain embodiments, the electronic controller 301, performing one or more intelligent display terminal operations, modifies the display data to form the modified display data based on a furthest distance between the display screen 205 and one or more viewers of the display screen 205. For example, the intelligent display terminal 115 includes one or more optical sensors 222. At least one of those optical sensors 222 is a camera. The electronic controller 301 may use the camera to identify each viewer viewing the display screen 205. The electronic controller 301 may also determine a distance between the intelligent display terminal 115 and each of the viewers viewing the display screen 205 to determine the greatest distance between the intelligent display terminal 115 and a viewer of the display screen 205. Based on the greatest distance between the intelligent display terminal 115 and a viewer of the display screen 205, the electronic controller 301 may modify the display data to form the modified display data that is used to generate an image for display that may be clearer and more easily seen by the viewer furthest from the display screen 205.

In certain embodiments, the electronic controller 301, performing one or more intelligent display terminal operations, modifies the display data to form the modified display data based on a brightness in an environment surrounding the display screen 205. For example, the intelligent display terminal 115 includes one or more optical sensors 222. At least one of those optical sensors 222 is a camera or a brightness sensors. The electronic controller 301 may use the camera or the brightness sensor to detect an amount of light or a brightness surrounding the intelligent display terminal 115 or in space including the intelligent display terminal 115 and a viewer of the display screen 205. Based on an amount of light or a brightness surrounding the intelligent display terminal 115 or in space including the intelligent display terminal 115 and a viewer of the display screen 205, the electronic controller 301 may modify the display data to form the modified display data in order to provide a displayed image that is brighter when a greater amount of light or a greater brightness is detected or a display image that is dimmer when a lesser amount of light or a lesser brightness is detected.

The electronic controller 301, performing one or more intelligent display terminal operations, generates an image for display on the display screen using the modified display data. In certain embodiments, the display data received from the electronic device 110 is used to generate an original image. The modified display data may be used to form an image that includes an image size change from the original image, a horizontal image pixel density change from the original image, a vertical image pixel density change from the original image, an image orientation change from the original image, an image brightness change from the original image, an image clarity change from the original image, an image color change from the original image, or an image placement change on the display screen relative to a placement of the original image on the electronic device display screen. For example, the display data may be used to display an original image on a small electronic device display screen in a vertical orientation. The modified display data may be used to display a sharper, clearer, brighter image that fits completely across a larger and wider display screen 205.

In certain embodiments, the electronic controller 301, performing one or more intelligent display terminal operations, initiates a transmission of the image for display on a display screen. The electronic controller 301 may initiate a transmission of the image generated using the modified display data to the display screen 205 for display. The image generated using the modified display data may be sharper, clearer, and brighter when displayed on the display screen 205 compared to an image generating using the original display data.

Additionally, or alternatively, the electronic controller 301 may generate a duplicate image for display on another display screen using the modified display data and initiate a transmission of the duplicate image for display on the other display screen for viewing. For example, the electronic controller 301 may be in data communication with an image projector for generating a large image for viewing by a plurality of people in an auditorium. After generating an image using the modified display data, the electronic controller 301 may generate a duplicate of the image using the modified display data and transmit the duplicate of the image to the image projector for viewing by the plurality of people in the auditorium. As another example, the electronic controller 301 may be in data communication with another terminal, such as another intelligent display terminal 115. After generating an image using the modified display data, the electronic controller 301 may generate a duplicate of the image using the modified display data and transmit the duplicate of the image to the other terminal for display on a display screen of the other terminal.

In certain embodiments, the electronic controller 301 is configured to receive a user input via the network interface or via a user interface 325 of the intelligent display terminal 115 to change one or more of an image size of the image, a horizontal image pixel density of the image, a vertical image pixel density of the image, an orientation of the image, a brightness of the image, a clarity of the image, a color of the image, a hue of the image, a placement of the image on the display screen, or the like. For example, after the electronic controller 301 initiates a transmission of the image for display on the display screen 205, the electronic controller 301 may receive a user input to lower a brightness of the displayed image while the image is viewed in low lighting, a placement of the displayed image on the display screen 205 from a corner of the display screen 205 to the middle of the display screen 205, and a size of the image to fit the entire area of the display screen 205.

In certain embodiments, the electronic controller 301, performing one or more intelligent display terminal operations, may generate for display an initial image using initial modified display data formed from initial display data that is transmitted from an initial electronic device 110 and may generate for display one or more additional images using additional modified display data formed from additional display data transmitted from one or more additional electronic devices 110. Thus, the electronic controller 301 may generate for display a plurality of images for simultaneous or contemporaneous display on the display screen 205.

For example, the electronic controller 301 may determine that at least first display data and second display data have been concurrently received from at least a first electronic device 110 and a second electronic device 110, respectively. The electronic controller 301 may divide or may have previously divided the display screen 205 into two or more display screen sections such as a first display screen section and a second display screen section, to display an image in a particular display screen section or to display multiple images simultaneously, with each image displayed in a different display screen section. In certain embodiments, the electronic controller 301 may divide the display screen 205 into one or more display screen sections for displaying image and one or more display screen sections for remaining without a displayed image as an energy saving mode of the intelligent display terminal 115 or to provide a display screen section to display the user interface 325.

After or while the electronic controller 301 modifies the first display data to form first modified display data based on a first display data attribute, a first electronic device attribute, and an axial orientation of the display screen 205, and generates a first image for display on the first display screen section of the display screen 205 using the first modified display data, the electronic controller 301 may modify the second display data to form second modified display data based on a second display data attribute, a second electronic device attribute, and an axial orientation of the display screen 205, and generates a second image for display on the second display screen section of the display screen 205 using the second modified display data. The electronic controller 301 may simultaneously or contemporaneously initiate a transmission of the first image to the display screen 205 for display on the first display screen section and initiate a transmission of the second image to the display screen 205 for display on the second display screen section. Accordingly, the display screen 205 may simultaneously or contemporaneously display the first image on the first display screen section and the second image on the second display screen section.

Figure 8:
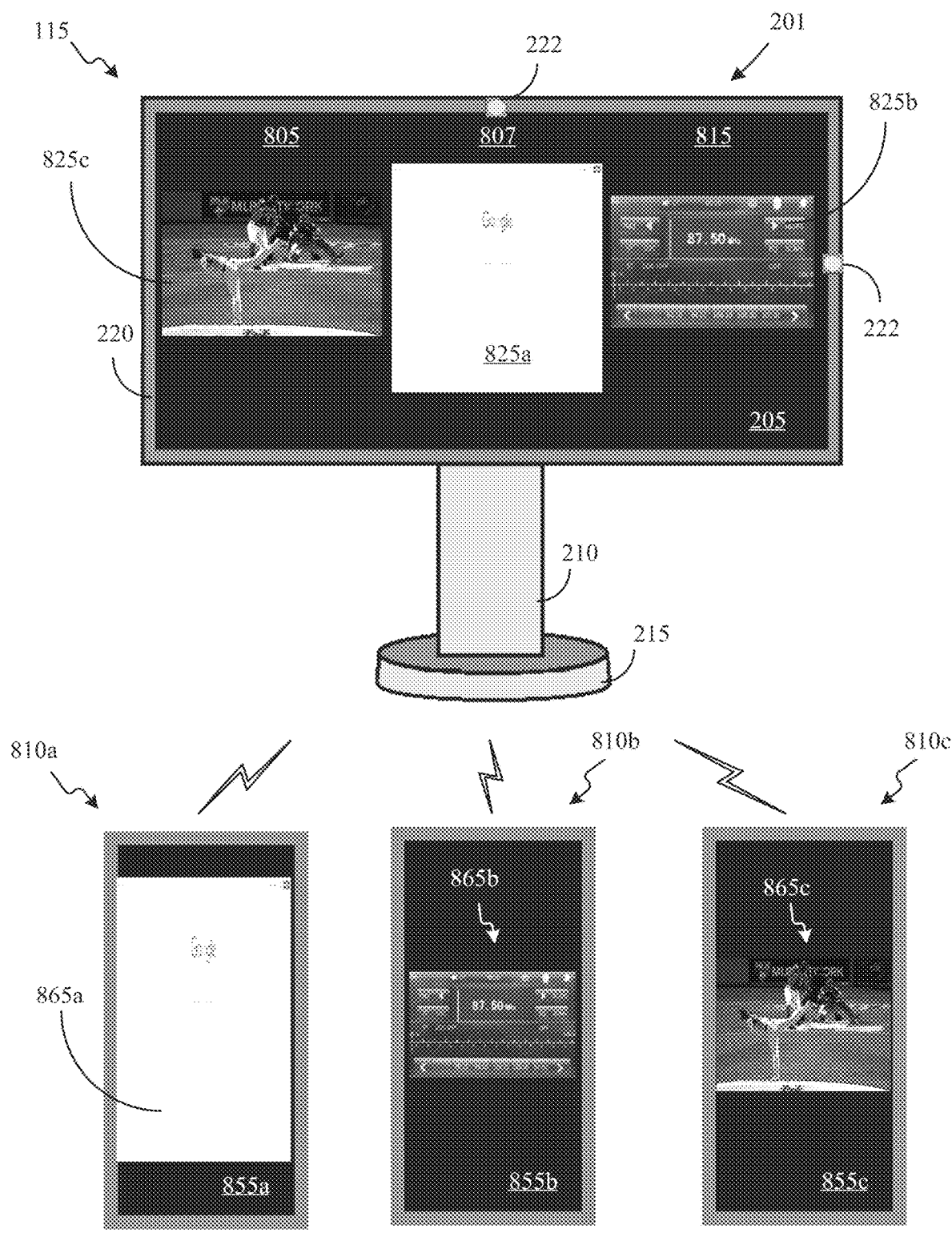

FIG. 8 is another diagram of an exemplary embodiment of operating an intelligent display terminal 115 according to certain embodiments of this disclosure. As illustrated in FIG. 8, the intelligent display terminal 115 includes the body 201, the display screen 205 surrounded by the bezel 220, and the one or more optical sensors 222. The body 201 is coupled to the stand 210 supported by the base 215. The electronic controller 301 has divided the display screen 205 into a first display screen section 805, a second display screen section 807, and a third display screen section 815. The electronic controller 301 is in data communication with a first electronic device 810a, a second electronic device 810b, and a third electronic device 810c. Each of the electronic devices 810a, 810b, and 810b may be the same as or at least similar to the electronic device 110 described herein. Each of the electronic devices 810a, 810b, and 810c may be displaying images 865a, 865b, and 865c, respectively. The images 865a, 865b, and 865c may be generated using first display data, second display data, and third display data, respectively.

The electronic controller 301 of the intelligent display terminal 115 may receive the first display data from the first electronic device 810a, the second display data from the second electronic device 810b, and the third display data from the third electronic device 810c. The electronic controller 301 may modify the first display data to form first modified display data based on a first display data attribute, a first electronic device attribute, and an axial orientation of the display screen 205, the second display data to form second modified display data based on a second display data attribute, a second electronic device attribute, and the axial orientation of the display screen 205, and the third display data to form third modified display data based on a third display data attribute, a third electronic device attribute, and the axial orientation of the display screen 205. The electronic controller 301 may subsequently generate a first image for display on the second display screen section 807 of the display screen 205 using the first modified display data, a second image for display on the third display screen section 815 of the display screen 205 using the second modified display data, and a third image for display on the first display screen section 805 of the display screen 205 using the third modified display data. The electronic controller 301 may simultaneously or contemporaneously initiate a transmission of the first image to the display screen 205 for display on the second display screen section 807, the second image to the display screen 205 for display on the third display screen section 815, and the third image to the display screen 205 for display on the first display screen section 805. Accordingly, the display screen 205 may simultaneously or contemporaneously display the first image 825a on the second display screen section 807, the second image 825b on the third display screen section 815, and the third image 825c on the first display screen section 805.

In certain embodiments and as shown in FIG. 8, each of the one or more display screen sections such as the first display screen section 805, the second display screen section 807, and the third display screen section 815 may have the same size and a same shape. Alternatively, one or more display screen sections may have a different size or a different shape from one or more other display screen sections.

Figure 9:
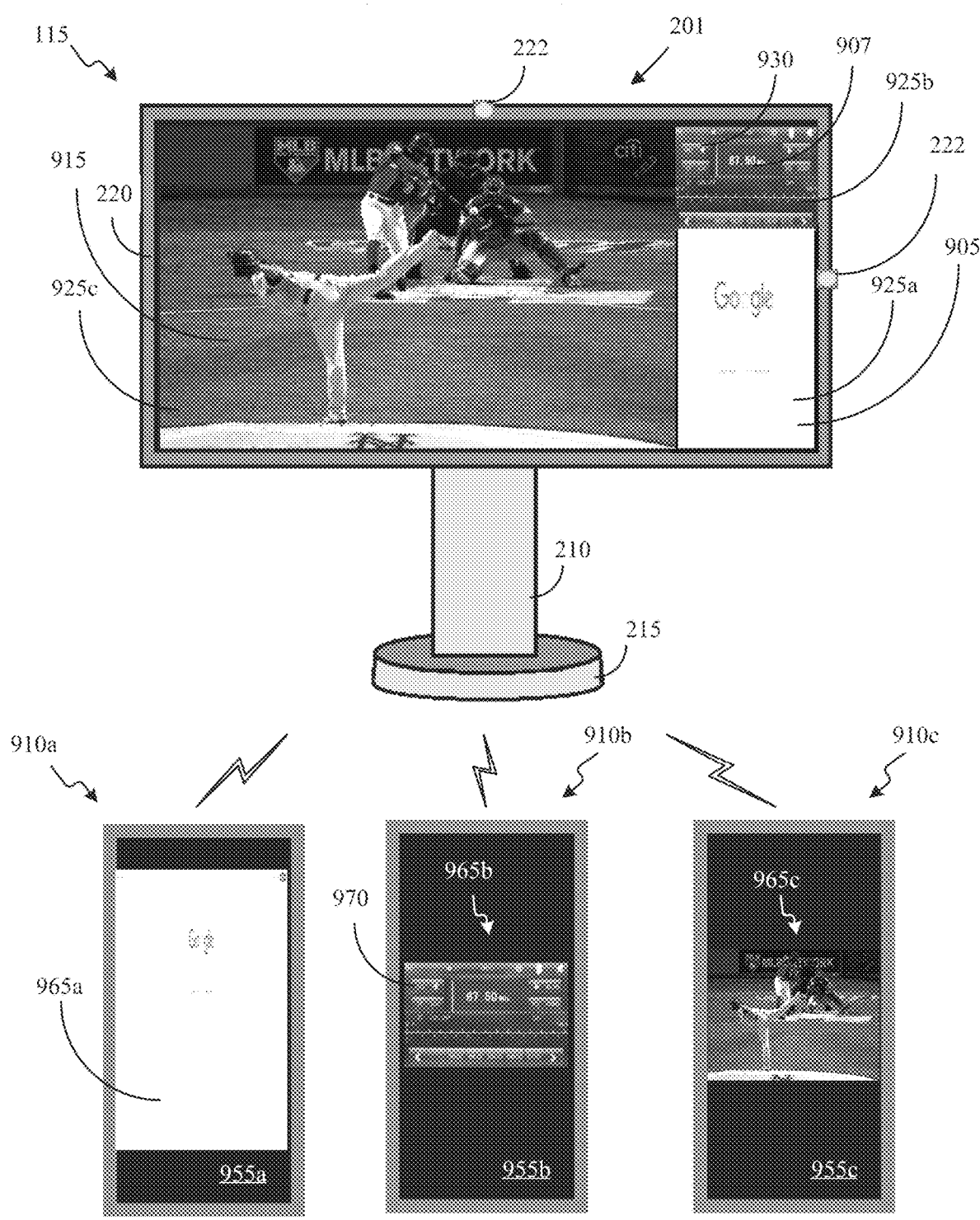

FIG. 9 is another diagram of an exemplary embodiment of operating an intelligent display terminal 115 according to certain embodiments of this disclosure. As illustrated in FIG. 9, the electronic controller 301 of the intelligent display terminal 115 has divided the display screen 205 into a first display screen section 905, a second display screen section 907, and a third display screen section 915. One or more of the display screens sections of the display screen 205 has a different size or a different shape from one or more other display screen sections of the display screen 205. For example, as shown in FIG. 9, the first display screen section 905 has a height greater than the second display screen section 907 but less than the height of the third display screen section 915. The first display screen section 905 has a width that is substantially equal to the width of the second display screen section 907 but is less than the width of the third display screen section 915. Further, each of the display screen sections 905, 907, and 915 occupy different amounts of space on the display screen 205.

At least similar to FIG. 8, the electronic controller 301, illustrated in FIG. 9, is in data communication with a first electronic device 910a, a second electronic device 910b, and a third electronic device 910c. Each of the electronic devices 910a, 910b, and 910b may be the same as or at least similar to the electronic device 110 described herein. Each of the electronic devices 910a, 910b, and 910c may be displaying images 965a, 965b, and 965c, respectively. The images 965a, 965b, and 965c may be generated using first display data, second display data, and third display data, respectively.

The electronic controller 301 of the intelligent display terminal 115 may receive the first display data from the first electronic device 910a, the second display data from the second electronic device 910b, and the third display data from the third electronic device 910c. The electronic controller 301 may modify the first display data to form first modified display data based on a first display data attribute, a first electronic device attribute, and an axial orientation of the display screen 205, the second display data to form second modified display data based on a second display data attribute, a second electronic device attribute, and the axial orientation of the display screen 205, and the third display data to form third modified display data based on a third display data attribute, a third electronic device attribute, and the axial orientation of the display screen 205. The electronic controller 301 may subsequently generate a first image for display on the first display screen section 905 of the display screen 205 using the first modified display data, a second image for display on the second display screen section 907 of the display screen 205 using the second modified display data, and a third image for display on the third display screen section 915 of the display screen 205 using the third modified display data. The electronic controller 301 may simultaneously or contemporaneously initiate a transmission of the first image to the display screen 205 for display on the first display screen section 905, the second image to the display screen 205 for display on the second display screen section 907, and the third image to the display screen 205 for display on the third display screen section 915. Accordingly, the display screen 205 may simultaneously or contemporaneously display the first image 925a on the first display screen section 905, the second image 925b on the second display screen section 907, and the third image 925c on the third display screen section 915 while each of the first display screen section 905, the second display section 907, and the third display section have a different size or a different shape.

In certain embodiments, the electronic controller 301 generates one or more display screen sections in their respective sizes and shapes based on relative priorities between two or more different sets of received display data, relative priorities of two or more electronic devices 110 from which these sets of display data are received, or the orientation of the display screen 205. For example, the electronic controller 301 may receive first display data from a first electronic device 110 and second display data from a second electronic device 110. The electronic controller 301, after performing intelligent display terminal operations with respect to the first display data and the second display, may generate a first display screen section having a first size and a first shape for display of the image generated using the first modified display data and a second display screen having a second size and a second shape for display of the image generated using the second modified display data based on one or more of a relative priority between a first program of the first display data and a second program of the second display data, a relative priority between a first image of the first display data and a second image of the second display data, or the like. The relative priorities may be preset by the electronic controller 301 or set by a user of the intelligent display terminal 115.

As another example, the electronic controller 301 may receive first display data from a first electronic device 110 via a first communication medium and second display data from a second electronic device 110 via a second communication medium. The electronic controller 301, after performing intelligent display terminal operations with respect to the first display data and the second display, may generate a first display screen section having a first size and a first shape for display of the image generated using the first modified display data and a second display screen having a second size and a second shape for display of the image generated using the second modified display data based on one or more of a relative priority between the first electronic device and the second electronic device, a relative priority between a first communication medium of the first electronic device with the network interface and a second communication medium of the second electronic device with the network interface, a relative priority between a type of the first electronic device and a type of the second electronic device, an orientation difference between the first electronic device and the second electronic device, or the like. The relative priorities may be preset by the electronic controller 301 or set by a user of the intelligent display terminal 115.

In certain embodiments, the electronic controller 301 may modify the display data based additionally on a size of a display screen section or a shape of a display screen section. For example, the electronic controller 301 may have generated first display screen section and a second display screen section on a display screen 205 for displaying images. The first display screen section may be three times as wide and twice the height of the second display screen section. The electronic controller 301 receives display data and determines that, after modifying the display data to form modified display data and after generating an image using the modified display data, the image is to be displayed in the first display screen section. The electronic controller 301 modifies the display data to form the modified display data based on a display data attribute, an electronic device attribute, an axial orientation of the display screen, and the size and the shape of the first display screen section. Using the modified display data, the electronic controller 301 generates an image having a particular an image size, a particular horizontal image pixel density, a particular vertical image pixel density, a particular image orientation, a particular image brightness, a particular image clarity, and a particular image color.

Subsequently, the electronic controller 301 receives the same display data and determines that, after modifying the display data to form modified display data and after generating an image using the modified display data, the image is to be displayed in the second display screen section. The electronic controller 301 modifies the display data to form the modified display data based on a display data attribute, an electronic device attribute, an axial orientation of the display screen, and the size and the shape of the second display screen section. Using the modified display data, the electronic controller 301 generates an image having at least one of an image size, a horizontal image pixel density, a vertical image pixel density, an image orientation, an image brightness, an image clarity, or an image color that is different from the image displayed in the first display screen section.

In certain embodiments, the electronic controller 301 may designate a display screen section of one or more display screen sections of the display screen 205 as a primary display screen section. The electronic controller 301 may also designate one or more other display screen sections of the one or more display screen sections of the display screen 205 as secondary or tertiary display screen sections or subordinate display screen sections. The electronic controller 301 may designate a display screen section as a primary display screen section based on a size or a shape of the display screen section. In certain embodiments, when the electronic controller 301 designates a display screen section as a primary display screen section, display data accompanied with audio data and that is used to display an image using intelligent display terminal operations, as described herein, and that is displayed in the primary display screen section has access to the speakers 234 to project audio associated with the image. In certain embodiments, when the electronic controller designates one or more other display screen sections as secondary or tertiary display screen sections or subordinate display screen sections, display data accompanied with audio data and that is used to display an image using intelligent display terminal operations, as described herein, and that is displayed in the secondary or tertiary display screen sections or the subordinate display screen sections does not have access to the speakers 234 to project audio associated with the image.

In certain embodiments, the electronic controller 301 determines whether a first image generated using first modified display data is to be displayed in a primary display screen section and a second image generated using second modified display data is to be displayed in a subordinate display screen section based on relative priorities between two or more different sets of received display data, relative priorities of two or more electronic devices 110 from which these sets of display data are received, or the orientation of the display screen 205. For example, the electronic controller 301 may display the first image in the primary display screen section and the second image in the subordinate display screen section based on one or more of a relative priority between a first program associated with the first image and a second program associated with the second.

As another example, the electronic controller 301 may have generated the first image by performing intelligent display terminal operations on first display data received from a first electronic device 110 via a first communication medium and the second image by performing intelligent display terminal operations on second display data received from a second electronic device 110 via a second communication medium. The electronic controller 301 may display the first image in the primary display screen section and the second image in the subordinate display screen section based on one or more of a relative priority between the first electronic device and the second electronic device, a relative priority between a first communication medium of the first electronic device with the network interface and a second communication medium of the second electronic device with the network interface, a relative priority between a type of the first electronic device and a type of the second electronic device, an orientation difference between the first electronic device and the second electronic device, or the like. The relative priorities may be preset by the electronic controller 301 or set by a user of the intelligent display terminal 115.

In certain embodiments, the electronic controller 301 determines whether a first image generated using first modified display data that is modified from first display data received from a first electronic device is to be displayed in a primary display screen section and a second image generated using second modified display data that is modified from second display data received from a second electronic device is to be displayed in a subordinate display screen section based on a comparison of a first distance between the first electronic device and the intelligent display terminal 115 and a second distance between the second electronic device and the intelligent display terminal 115. For example, the electronic controller 301 using an optical sensor 222, such as a camera, may determine a first distance between the first electronic device and the intelligent display terminal 115. The electronic controller 301 using the optical sensor 222 may also determine a second distance between the second electronic device and the intelligent display terminal 115. After determining the first distance and the second distance, the electronic controller 301 determines whether the first image is to be displayed in the primary display screen section while the second image is to be displayed in the subordinate display screen section or the second image is to be displayed in the primary display screen section while the first image is to be displayed in the subordinate display screen section based on a difference between the first distance and the second distance. For example, the electronic controller 301 may display the first image in the primary display screen section and the second image in the subordinate display screen section when the first distance is less than the second distance. As another example, the electronic controller 301 may display the second image in the primary display screen section and the first image in the subordinate display screen section when the first distance is greater than the second distance.

In certain embodiments, a first image may be displayed in a first display screen section and a second image may be displayed in a second display screen section where neither the first display screen section nor the second display screen section have been designated as either a primary display screen section or a subordinate display screen section. The first image may have been generated using first modified display data that was modified from first display data received from a first electronic device and the second image may have generated using second modified display data that was modified from second display data received from a second electronic device. The electronic controller 301 using an optical sensor 222, such as a camera, may determine a first distance between the first electronic device and the intelligent display terminal 115. The electronic controller 301 using the optical sensor 222 may also determine a second distance between the second electronic device and the intelligent display terminal 115. After determining the first distance and the second distance, the electronic controller 301 may designate the first display screen section as the primary display screen section and the second display screen section as the subordinate display screen section when the first distance is less than the second distance. The electronic controller 301 may designate the second display screen section as the primary display screen section and the first display screen section as the subordinate display screen section when the first distance is greater than the second distance.

In certain embodiments, the electronic controller 301, performing one or more intelligent display terminal operations, detects a selection input (e.g., a touch input, a selection by cursor, a selection by mouse arrow) at a selectable location of an image on the display screen 205. The electronic controller 301 generates a selection input signal for transmission to the electronic device 110, via the network interface, to execute a function using the electronic device 110 that is associated with the selectable location.

For example, as shown in FIG. 9, the second image 925b is an image of an audio player display. The second image 925b includes a selectable location 930 that correlates with a selectable location 970 on second image 965b. When the selectable location 930 is selected, the electronic controller 301 detects the selection at the selectable location 930 and generates a selection input signal for transmission to the electronic device 910b. The electronic controller 301 initiates the transmission of the selection input signal to the electronic device 910b so that the electronic device 910b executes a function that is associated with the selectable location 930. After the electronic device 910b executes the function that is associated with the selectable location 930, the electronic controller 301 receives display data that is associated with the executed function to generate an image for display using intelligent display terminal operations, as described herein, or audio output for projecting audio via speaker 234 of the intelligent display terminal 115. The electronic controller 301 generates the image associated with the executed function for display on a display screen 205 and causes the display screen 205 to display that image.

In certain embodiments, the electronic controller 301 receives orientation data indicating an orientation of an electronic device display screen. Based on the received orientation data, the electronic controller 301 generates a rotation signal to rotate the display screen 205 to match the orientation of the electronic device display screen. For example, a coupling 232 attaches the intelligent display terminal 115 to a fixed object includes an actuator 233 configured to drive a rotation of the body 201 and the display screen 205 about an axis that is normal to a surface of the display screen 205. The electronic controller 301 generates a rotation signal to command the actuator 233 to rotate the display screen 205 to match the orientation of the electronic device display screen.

As described herein, the electronic controller 301 may initiate a transmission of the image generated using the modified display data to the display screen 205. Additionally, or alternatively, the electronic controller 301 may generate a duplicate image for display on another display screen using the modified display data and initiate a transmission of the duplicate image for display on the other display screen for viewing. For example, the electronic controller 301 may be in data communication with an image projector for generating a large image for viewing by a plurality of people in an auditorium. After generating an image using the modified display data, the electronic controller 301 may generate a duplicate of the image using the modified display data and transmit the duplicate of the image to the image projector for viewing by the plurality of people in the auditorium. As another example, the electronic controller 301 may be in data communication with another terminal, such as another intelligent display terminal 115. After generating an image using the modified display data, the electronic controller 301 may generate a duplicate of the image using the modified display data and transmit the duplicate of the image to the other terminal for display on a display screen of the other terminal.

Figure 10:
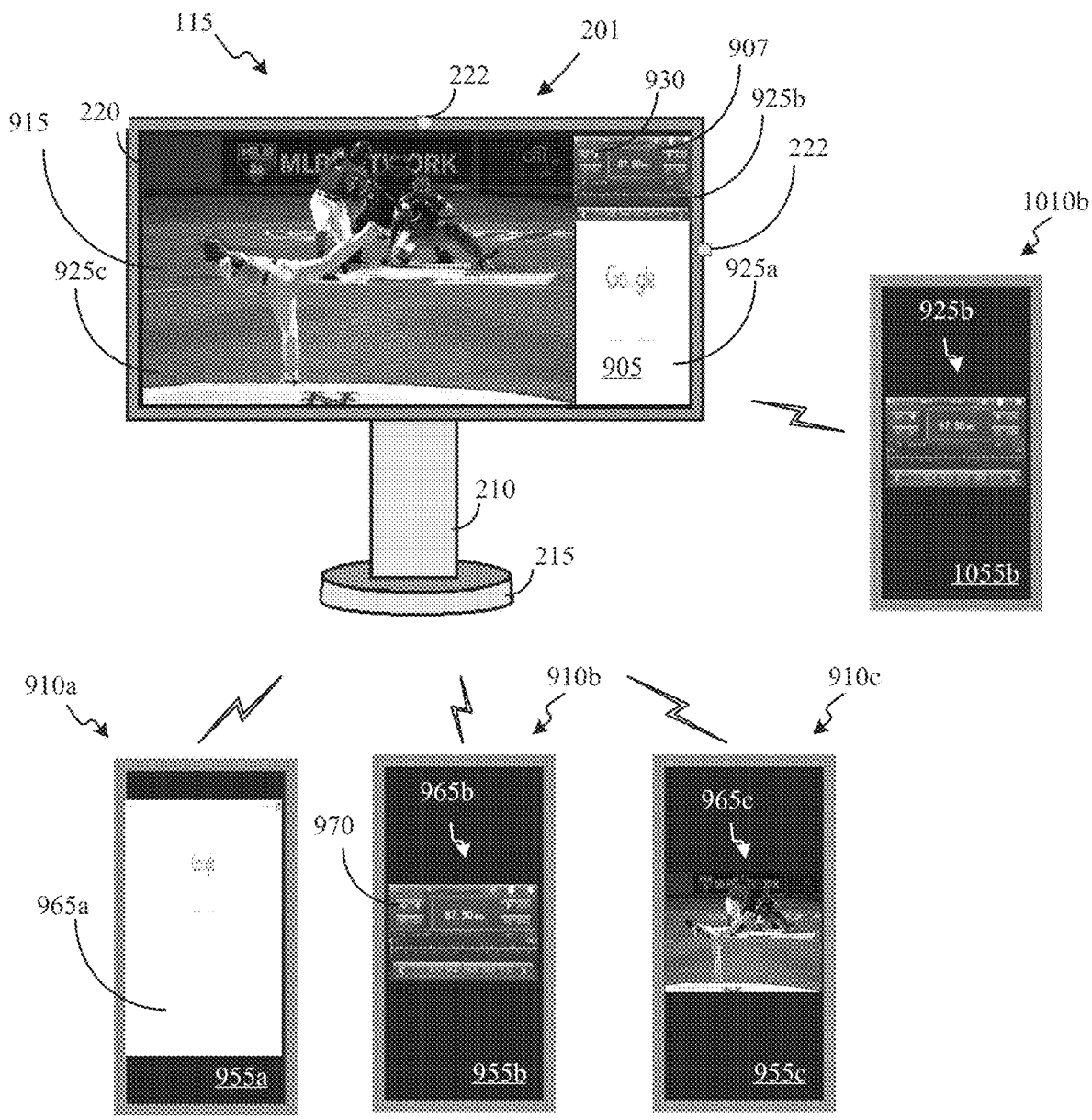

FIG. 10 is another diagram of an exemplary embodiment of operating an intelligent display terminal 115 according to certain embodiments of this disclosure. FIG. 10 may include the same or similar features illustrated and described in FIGS. 8 and 9 herein. In addition, FIG. 10 includes a fourth electronic device 1010b having an electronic device display screen 1055b.

The electronic controller 301 of the intelligent display terminal 115 may receive the second display data from the second electronic device 910b, modify the second display data to form second modified display data based on a second display data attribute, a second electronic device attribute, and the axial orientation of the display screen 205. The electronic controller 301 may subsequently generate a second image for display on the second display screen section on the display screen 205 using the second modified display data. The electronic controller 301 may initiate a transmission of the second image to the display screen 205 for display on the display screen 205. The electronic controller 301 may simultaneously or contemporaneously initiate a transmission of the second image to the fourth electronic device 1010b for display on the electronic device display screen 1055b. Accordingly, the display screen 205 may simultaneously or contemporaneously display the second image 925b generated using the second modified display data on the display screen 205 and the electronic device display screen 1055b.

Figure 11:
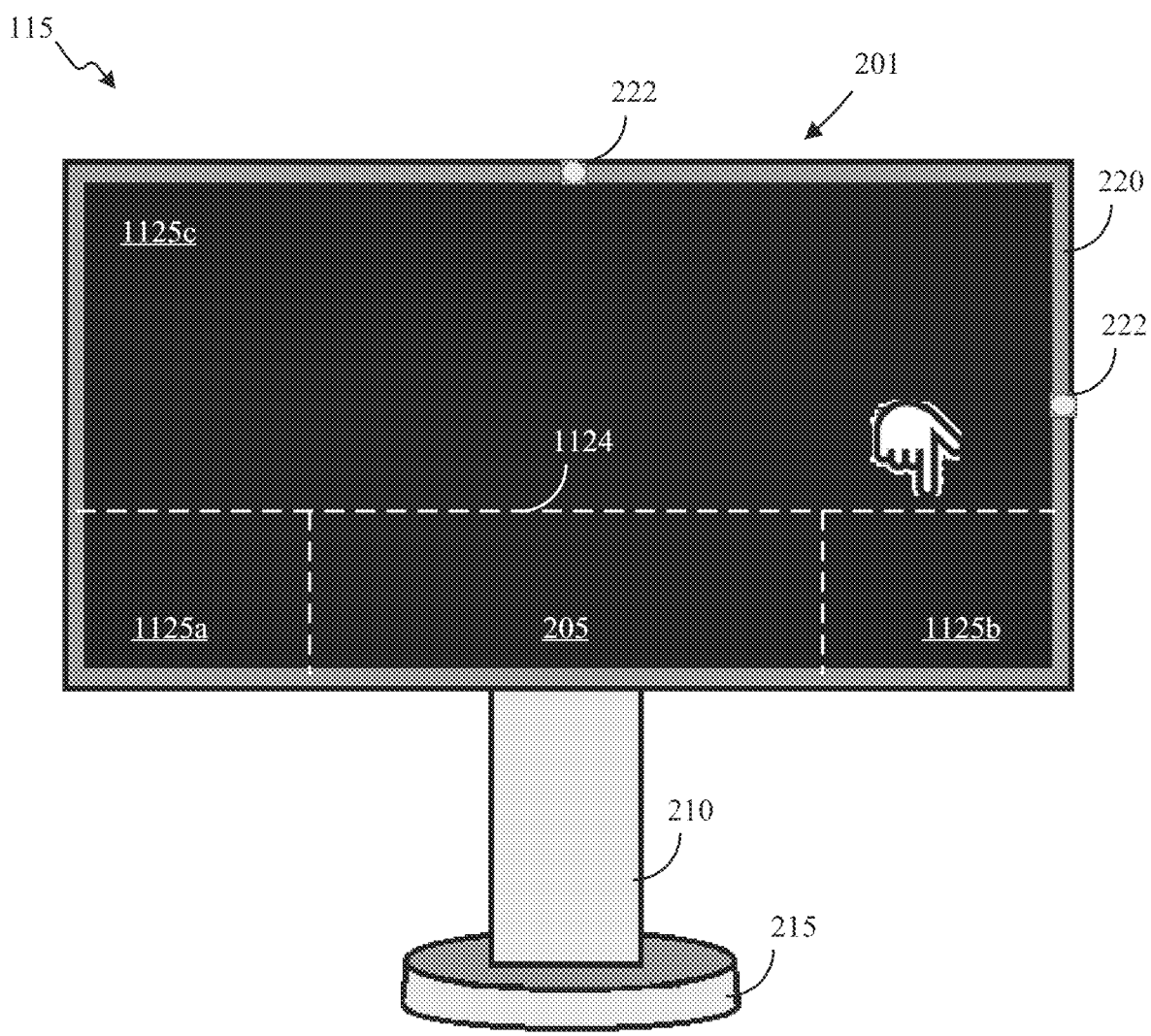

As described herein, the electronic controller 301 may divide the display screen 205 into one or more display screen sections. Additionally, or alternatively, the display screen 205 may be divided into one or more display screen sections using one or more display screen section tracing inputs. FIG. 11 is another diagram of an exemplary embodiment of operating an intelligent display terminal 115 according to certain embodiments of this disclosure. The electronic controller 301 of the intelligent display terminal 115 illustrated in FIG. 11 has detected one or more display screen section tracing inputs indicating one or more perimeters 1124 to define a first display screen section 1125a, a second display screen section 1125b, and a third display screen section 1125c. The display screen section tracing inputs may be provided via touch inputs when the display screen 205 is a touchscreen. Additionally, or alternatively, the display screen section tracing inputs may be provided using a cursor navigated by mouse.

Figure 12:
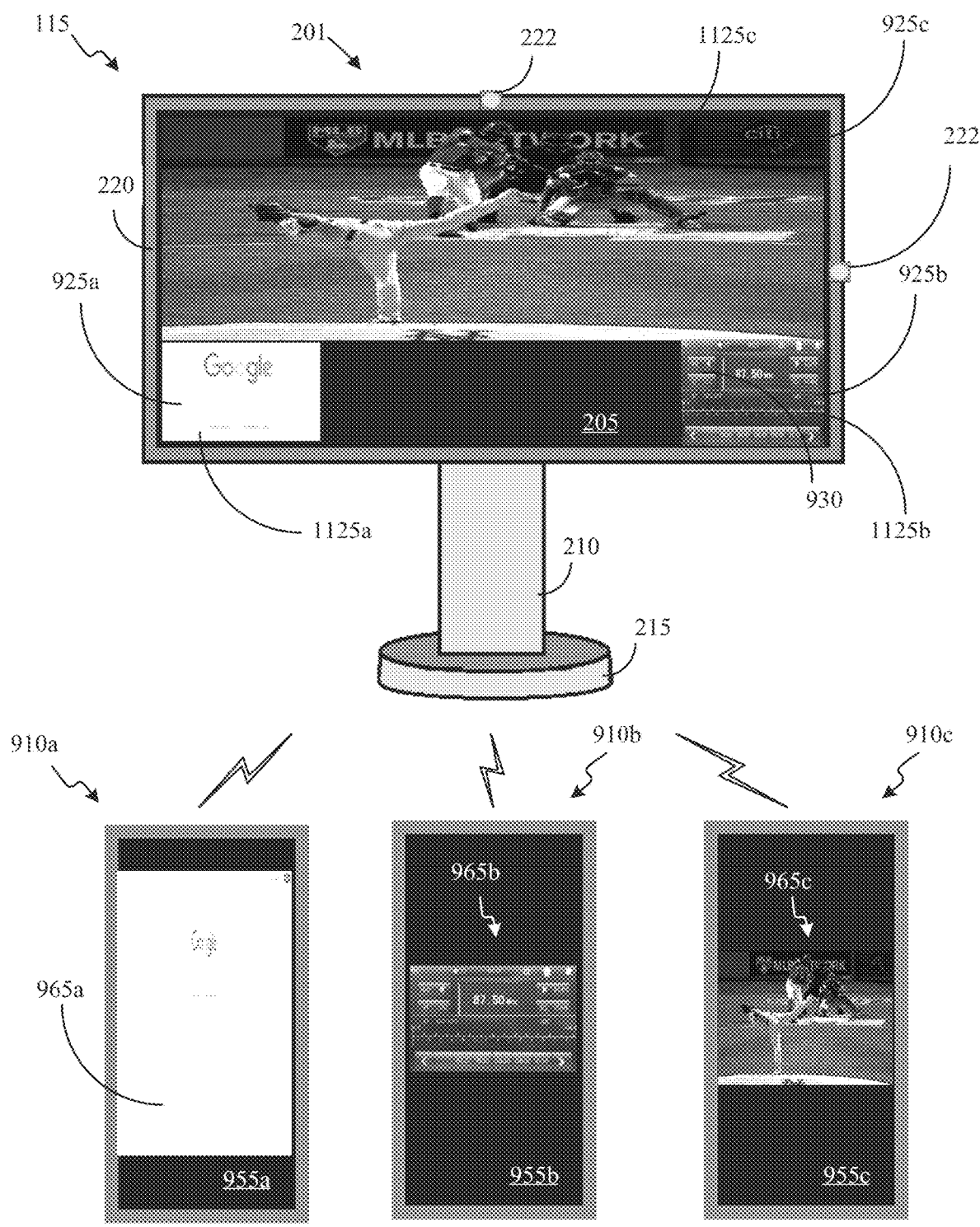

After the electronic controller 301 detects the received display screen section tracing inputs, the electronic controller 301 may generate an image for display in one or more of the display screen sections. FIG. 12 is another diagram of an exemplary embodiment of operating an intelligent display terminal 115 according to certain embodiments of this disclosure. As shown in FIG. 12, the display screen 205 includes the first display screen section 1125a, the second display screen section 1125b, and the third display screen section 1125c formed by the perimeter traced through the display screen section tracing inputs described with respect to FIG. 11. The electronic controller 301 may have received display data from each of the first electronic device 910a, the second electronic device 910b, and the third electronic device 910c, modified each of the display data to form modified display data, as described herein, and generated three images 925a, 925b, and 925c using the respective modified display data. The electronic controller 301 displays the three images 925a, 925b, and 925c in the respective three display screen sections 1125a, 1125, and 1125c defined by the display screen tracing inputs. It should be noted, that the three display screen sections 1125a, 1125, and 1125c do not occupy the entire display screen 205. In this case, the electronic controller 301 may use the unoccupied space to display the user interface 325 described herein. Additionally, or alternatively, the unoccupied space may remain unoccupied to reduce energy consumption by the intelligent display terminal 115.

Figure 13:
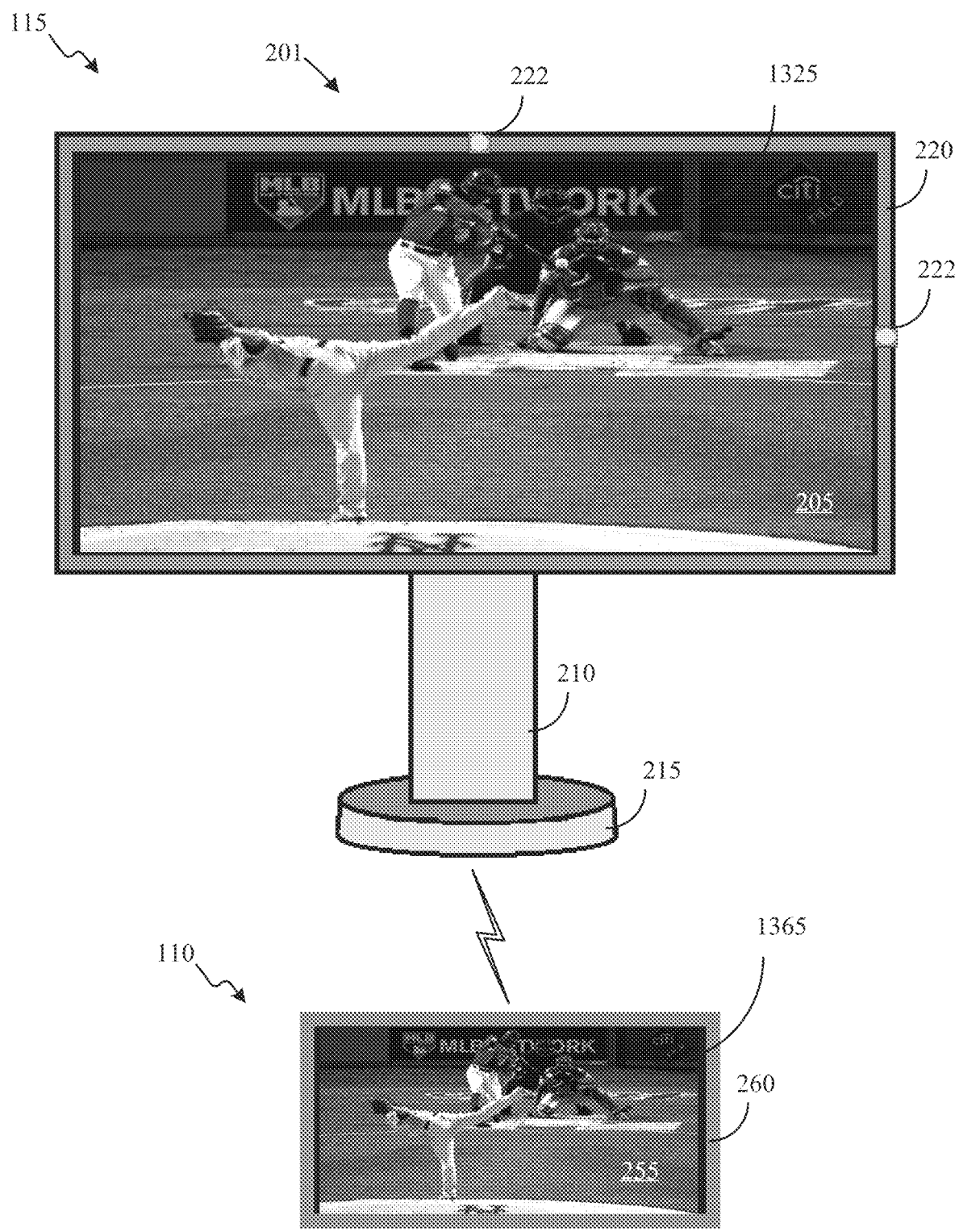
Figure 14:
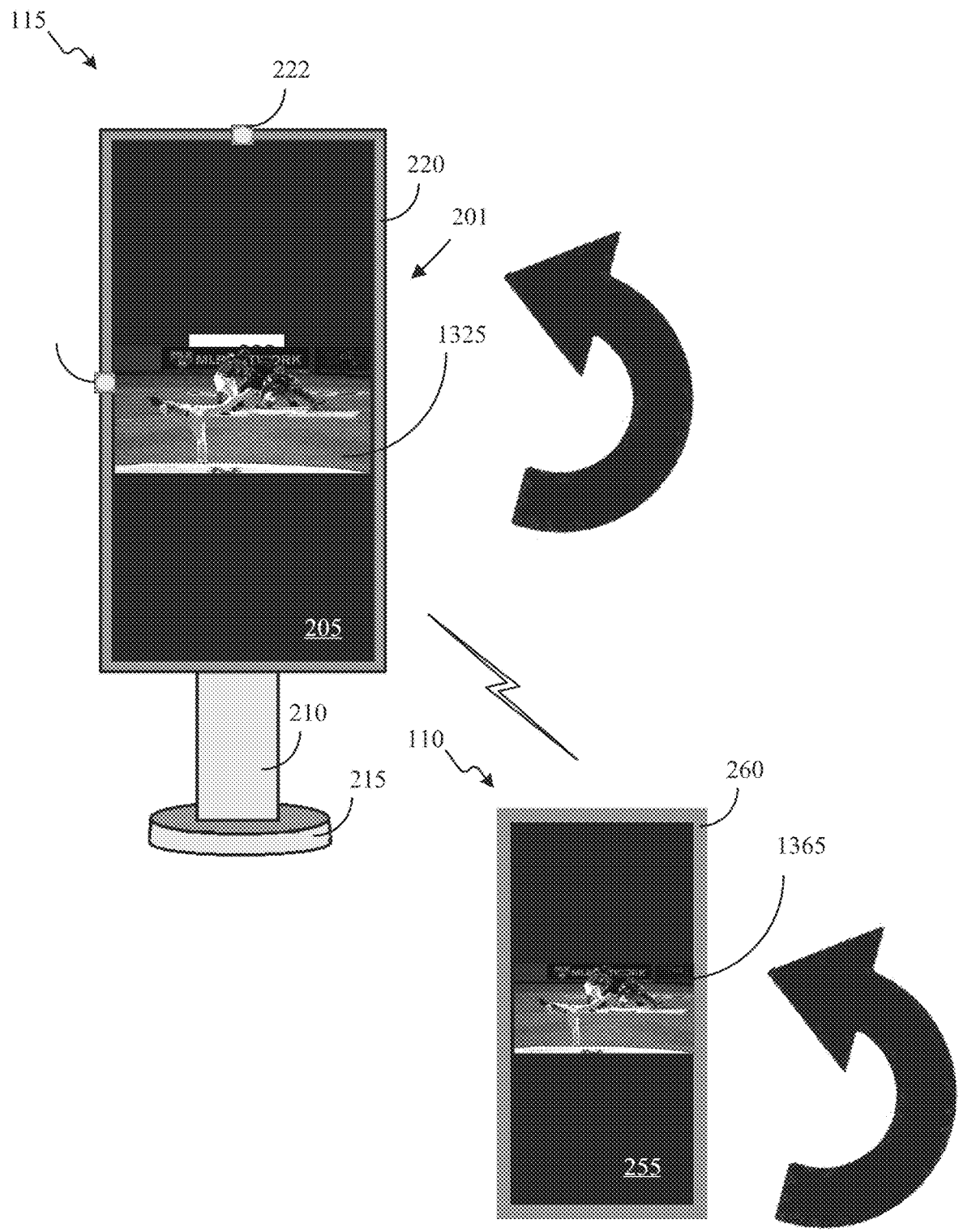

FIGS. 13 and 14 are diagrams of exemplary embodiments of operating an intelligent display terminal according to certain embodiments of this disclosure. As illustrated in FIGS. 13 and 14, the intelligent display terminal 115 includes the body 201, the display screen 205 surrounded by the bezel 220, and the one or more optical sensors 222. The body 201 is coupled to the stand 210 supported by the base 215. The intelligent display terminal 110 also includes an actuator 233, as describe herein. The display screen 205 is displaying an image 1325 that was generated using modified display data. The electronic device 110 has transmitted display data that was modified by the electronic controller 301 to form the modified display data and displays the image 1365 on the electronic device display screen 255 that was generated using the display data. As shown in FIG. 13, both the display screen 205 of the intelligent display terminal 115 and the electronic device display screen 255 of the electronic device 110 are positioned in the horizontal orientation. The electronic device display screen 255 may be rotated from the horizontal orientation to a vertical orientation as shown in FIG. 14. When the electronic device display screen 255 is rotated, the electronic controller 301 receives orientation data from the electronic device 110 indicating a new orientation of the electronic device display screen 255. The electronic controller 301 may generate a rotation signal based on the received orientation data directing the actuator 233 to rotate the body 201 and the display screen 205 to match the orientation of the electronic device display screen 255 as shown in FIG. 14.

In addition, as illustrated in FIGS. 13 and 14, the orientation sensor 320 may be used the electronic controller 230 to maintain the image 1325 in an upright position. As the display screen 205 of the intelligent display terminal rotates, the orientation sensor 320 provides an indication of the direction of gravitation pull to the electronic controller 301. The electronic controller 301 rotates the image in the opposite direction of the display screen 205 to maintain the image 1325 in the upright position.

In certain embodiments, the electronic controller 301 displaying an image generated using modified display data may change one or more of an image size, an image shape, a horizontal image pixel density of the image, a vertical image pixel density of the image, a brightness of the image, a clarity of the image, a color of the image, a hue of the image, a placement of the image on the display screen 205, or the like when the display screen 205 rotates changing an orientation of the display screen 205. For example, as illustrated in FIGS. 13 and 14, the electronic controller 301 may change a size and a shape of the image 1325 as the display screen 205 rotates from the horizontal orientation to the vertical orientation.

The electronic controller 301 of the intelligent display terminal 115 may receive orientation data from the electronic device 110 indicative of the image 265. The display data from the electronic device 110 may also include an indication that the electronic device 110 is positioned in the vertical orientation. The electronic controller 301 after receiving the display data may modify the display data based on the horizontal orientation of the display screen 205 and the vertical orientation of the electronic device display screen 255 to generate the image 225 on the display screen 205.

Figure 15:
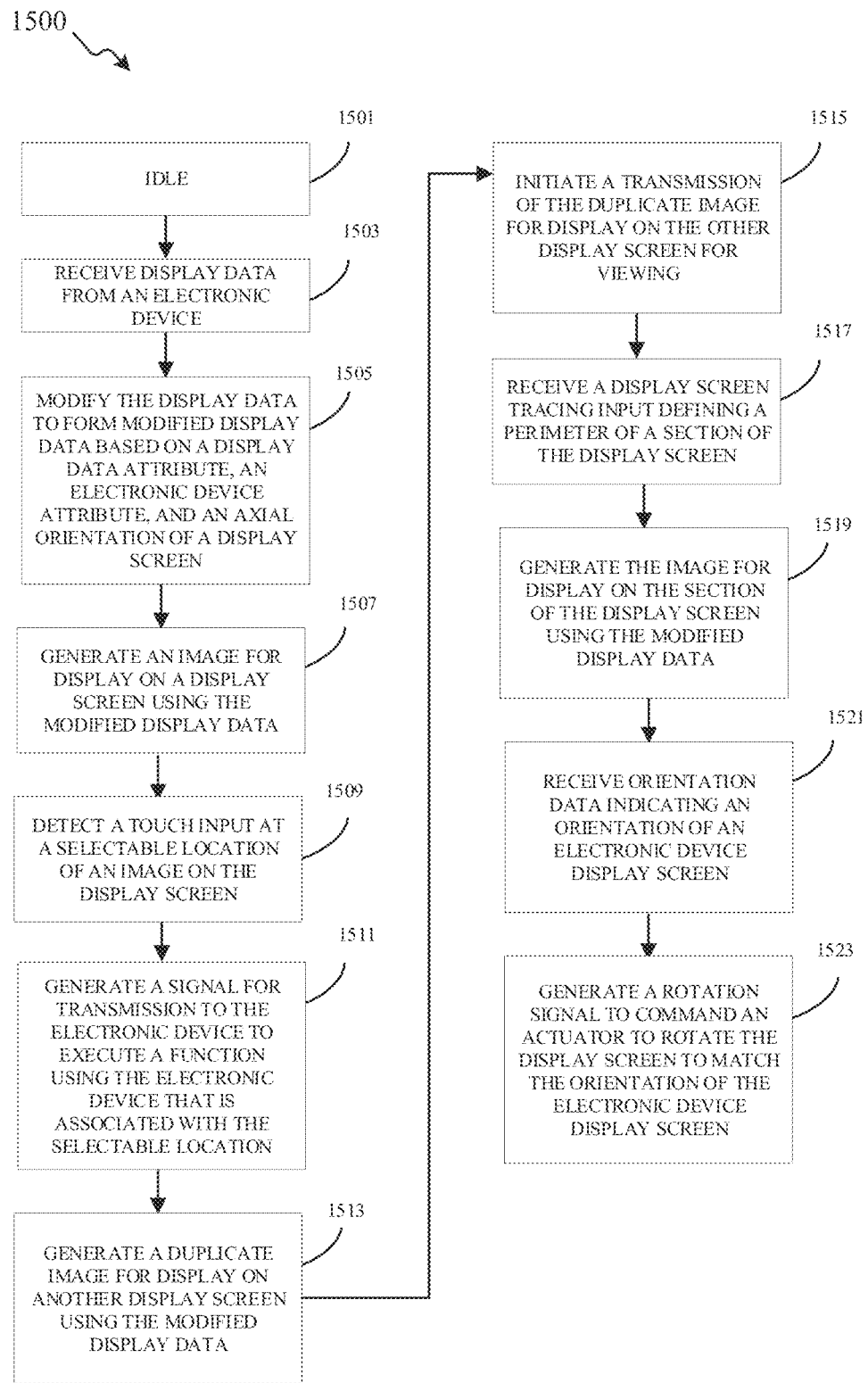
FIGS. 15 and 16 illustrate exemplary methods implemented by one or more processors of an intelligent display terminal for performing intelligent display terminal operations according to certain embodiments of this disclosure.

FIG. 15 illustrates an example method 1500 implemented by an electronic controller 301 of an intelligent display terminal 115 for performing intelligent display terminal operations according to certain embodiments of this disclosure. Although certain details will be provided with reference to the method 1500 of FIG. 15, it should be understood that other embodiments may include more, less, or different method steps. In FIG. 15, the method 1500 includes, at step 1501, that the electronic controller 301 of the intelligent display terminal 115 is in an idle state at least with respect to performing intelligent display terminal operations.

At step 1503, the electronic controller 301 receives display data from an electronic device 110. The display data is used to generate an original image on an electronic device display screen. The original image includes an original image size, an original horizontal image pixel density, an original vertical image pixel density, an original image orientation, an original image brightness, an original image clarity, an original image color, an original image hue, an original image placement on an electronic device display screen, or the like. It should be understood that the term "image" includes both a still image and a moving image (e.g., a video).

At step 1505, the electronic controller 301 modifies the display data to form modified display data based on a display data attribute, an electronic device attribute, and the actual orientation of the display screen 205. Display data attributes may include display data presentation characteristics or display data types. Electronic device attributes may include an electronic device type providing the display data, an electronic device orientation, one or more operating capabilities of the electronic device 110 providing the display data, a distance between the electronic device 110 and the intelligent display terminal 115, an electronic device communication medium with the network interface, or the like.

At step 1507, the electronic controller 301 generates an image for display on the display screen 205 using the modified display data. In certain embodiments, the electronic controller 301 initiate a transmission of the image to the display screen 205 for display.

At step 1509, the electronic controller 301 detects a selection input at a selectable location of an image on a display screen 205. The selection input may be a touch input, a selection by cursor, or a selection by mouse arrow detected at a selectable location of an image on the display screen 205. At step 1511, the electronic controller 301 generates a selection input signal for transmission to the electronic device 110 to execute a function using the electronic device 110 that is associated with the selectable location.

At step 1513, the electronic controller 301 generates a duplicate image for display on another display screen using the modified display data. At step 1515, the electronic controller 301 initiates a transmission of the duplicate image for display on the other display screen or viewing. For example, the electronic controller 301 may be in data communication with an image projector for generating a large image for viewing by a plurality of people in an auditorium. After generating an image using the modified display data, the electronic controller 301 may generate a duplicate of the image using the modified display data and transmit the duplicate of the image to the image projector for viewing by the plurality of people in the auditorium. As another example, the electronic controller 301 may be in data communication with another terminal, such as another intelligent display terminal 115. After generating an image using the modified display data, the electronic controller 301 may generate a duplicate of the image using the modified display data and transmit the duplicate of the image to the other terminal for display on a display screen of the other terminal.

At step 1517, the electronic controller 301 receives a display screen tracing input defining a perimeter of a display screen section of the display screen 205. At step 1519, the electronic controller 301 generates the image for display on the display screen section of the display screen 205 using the modified display data. For example, the electronic controller 301 of the intelligent display terminal 115 may have detected one or more display screen section tracing inputs indicating one or more perimeters to define a first display screen section, a second display screen section, and a third display screen section. The display screen section tracing inputs may be provided via touch inputs when the display screen 205 is a touchscreen. Additionally, or alternatively, the display screen section tracing inputs may be provided using a cursor navigated by mouse. After the electronic controller 301 detects the received display screen section tracing inputs, the electronic controller 301 may generate an image for display in one or more of the display screen sections.

At step 1521, the electronic controller 301 receives orientation data indicating an orientation of an electronic device display screen. At step 1523, the electronic controller 301 generates a rotation signal to command an actuator of the intelligent display terminal 115 to rotate the display screen 205 to match the orientation of the electronic device display screen. For example, both a display screen 205 of an intelligent display terminal 115 and an electronic device display screen 255 of an electronic device 110 may be positioned in a horizontal orientation. The electronic device display screen 255 may be rotated from the horizontal orientation to a vertical orientation. When the electronic device display screen 255 is rotated, the electronic controller 301 receives orientation data from the electronic device 110 indicating a new orientation of the electronic device display screen 255. The electronic controller 301 may generate a rotation signal based on the received orientation data directing the actuator 233 to rotate the body 201 and the display screen 205 to match the orientation of the electronic device display screen 255.

Figure 16:
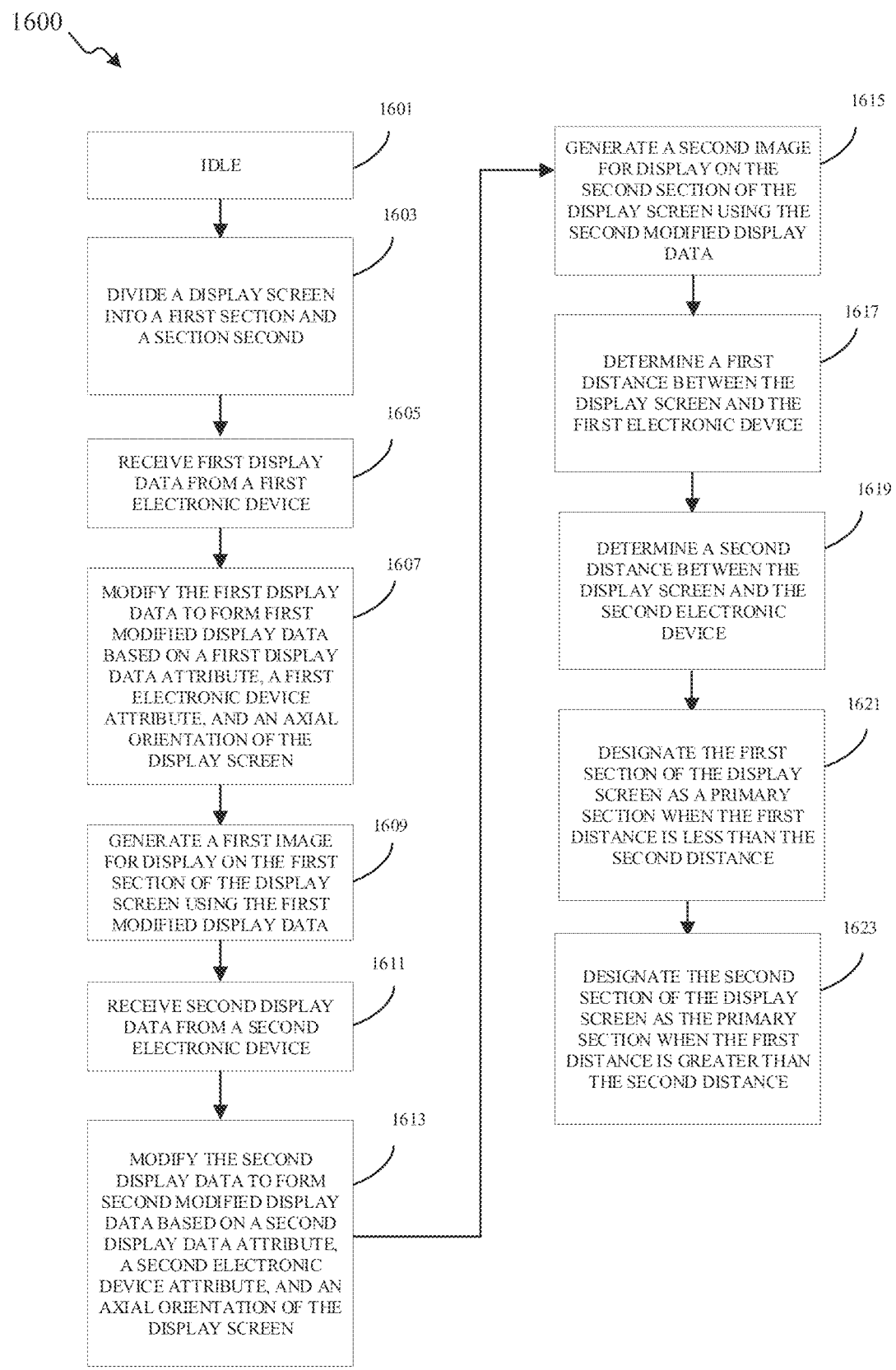

FIG. 16 illustrates an example method 1600 implemented by an electronic controller 301 of an intelligent display terminal 115 for performing intelligent display terminal operations according to certain embodiments of this disclosure. Although certain details will be provided with reference to the method 1600 of FIG. 16, it should be understood that other embodiments may include more, less, or different method steps. In FIG. 16, the method 1600 includes, at step 1601, that the electronic controller 301 of the intelligent display terminal 115 is in an idle state at least with respect to performing intelligent display terminal operations.

At step 1603, the electronic controller 301 divides a display screen 205 into at least a first display screen section and a second display screen section. In certain embodiments, the electronic controller 301 divides the display screen 205 into at least a first display screen section and a second display screen section. In certain embodiments, the display screen 205 may be divided into one or more display screen sections using one or more display screen section tracing inputs provide by a user.

At step 1605, the electronic controller 301 receives first display data from a first electronic device 110. Step 1605 is at least similar to step 1503 of method 1500 illustrated in FIG. 15. At step 1607, the electronic controller 301 modifies the first display data to form first modified display data based on a first display data attribute, a first electronic device attribute, and an axial orientation of the display screen 205. Step 1607 is at least similar to step 1505 of method 1500 illustrated in FIG. 15. At step 1609, the electronic controller 301 generates a first image for display on the first display screen section of the display screen 205 using the first modified display data. Step 1609 is at least similar to step 1507 of method 1500 illustrated in FIG. 15. In certain embodiments, the electronic controller 301 initiate a transmission of the first image to the display screen 205 for display.

At step 1611, the electronic controller 301 receives second display data from a second electronic device 110. Step 1611 is at least similar to step 1503 of method 1500 illustrated in FIG. 15. At step 1613, the electronic controller 301 modifies the second display data to form second modified display data based on a second display data attribute, a second electronic device attribute, and an axial orientation of the display screen 205. Step 1613 is at least similar to step 1505 of method 1500 illustrated in FIG. 15. At step 1615, the electronic controller 301 generates a second image for display on the second display screen section of the display screen 205 using the second modified display data. Step 1615 is at least similar to step 1507 of method 1500 illustrated in FIG. 15.

At step 1617, the electronic controller 301 determines a first distance between the display screen 205 and the first electronic device 110. At step 1619, the electronic controller 301 determines a second distance between the display screen and the second electronic device 110. At step 1621, the electronic controller 301 designates the first display screen section of the display screen 205 as a primary display screen section when the first distance is less than the second distance. At step 1623, the electronic controller 301 designates the second display screen section of the display screen 205 as the primary display screen section when the first distance is greater than the second distance.

For example, a first image may be displayed in a first display screen section and a second image may be displayed in a second display screen section where neither the first display screen section nor the second display screen section have been designated as either a primary display screen section or a subordinate display screen section. The first image may have been generated using first modified display data that was modified from first display data received from a first electronic device and the second image may have generated using second modified display data that was modified from second display data received from a second electronic device. The electronic controller 301 using an optical sensor 222, such as a camera, may determine a first distance between the first electronic device and the intelligent display terminal 115. The electronic controller 301 using the optical sensor 222 may also determine a second distance between the second electronic device and the intelligent display terminal 115. After determining the first distance and the second distance, the electronic controller 301 may designate the first display screen section as the primary display screen section and the second display screen section as the subordinate display screen section when the first distance is less than the second distance. The electronic controller 301 may designate the second display screen section as the primary display screen section and the first display screen section as the subordinate display screen section when the first distance is greater than the second distance.

Figure 17:
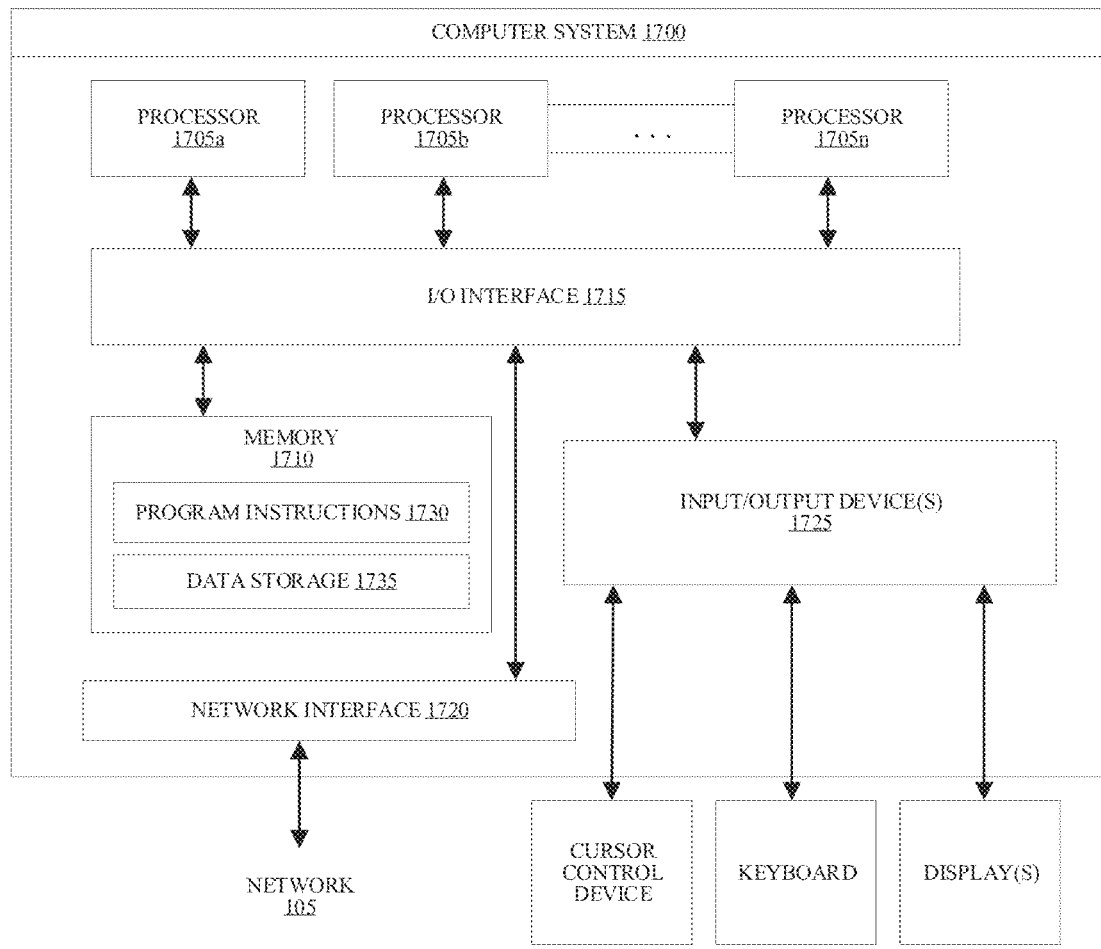
FIG. 17 illustrates a non-limiting, exemplary computer system configured to implement aspects of systems and methods according to certain embodiments of this disclosure.

FIG. 17 illustrates a non-limiting, example computer system 1700 configured to implement systems and methods for performing intelligent display terminal operations according to certain embodiments of this disclosure. FIG. 17 illustrates a computer system 1700 that is configured to execute any and all of the embodiments described herein. In certain embodiments, the computer system 1700 describes at least some of the components of electronic device 110 and the intelligent display terminal 115 illustrated in FIG. 1. In certain embodiments, the computer system 1700 describes at least some of the components of electronic controller 301 illustrated in FIG. 3. In different embodiments, the computer system 1700 may be any of various types of devices, including, but not limited to, a computer embedded in a vehicle, a computer embedded in an appliance, a personal computer system, a desktop computer, a handset (e.g., a laptop computer, a notebook computer, a tablet, a slate, a netbook computer, a camera, a handheld video game device, a handheld computer, a video recording device, a consumer device, a portable storage device, or the like), a mainframe computer system, a workstation, network computer, a set top box, a video game console, a mobile device (e.g., electronic controller 301 of a handset), an application server, a storage device, a television, a peripheral device such as a switch, modem, router, or in general any type of computing or electronic device.

Various embodiments of a system and method for performing intelligent display terminal operations, as described herein, may be executed on one or more computer systems 1700, which may interact with various other devices. In the illustrated embodiment, the computer system 1700 includes one or more processors 1705 coupled to a system memory 1710 via an input/output (I/O) interface 1715. The computer system 1700 further includes a network interface 1720 coupled to I/O interface 1715, and one or more input/output devices 1725, such as cursor control device, keyboard, and display(s). In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1705a, or a multiprocessor system including several processors 1705a-1705n (e.g., two, four, eight, or another suitable number). The processors 1705 may be any suitable processor capable of executing instructions. For example, in various embodiments the processors 1705 may be general-purpose or embedded processors implementing any of a variety of instruction set architectures (ISAs), such as the x86, PowerPC, SPARC, or MIPS ISAs, or any other suitable ISA. In multiprocessor systems, each of processors 1705 may commonly, but not necessarily, implement the same ISA.

The system memory 1710 may be configured to store the program instructions 1730 and/or existing state information and ownership transition condition data in the data storage 1735 accessible by the processor 1705. In various embodiments, the system memory 1710 may be implemented using any suitable memory technology, such as static random access memory (SRAM), synchronous dynamic RAM (SDRAM), nonvolatile/Flash-type memory, or any other type of memory. In the illustrated embodiment, the program instructions 1730 may be configured to implement a system for package delivery incorporating any of the functionality, as described herein. In some embodiments, program instructions and/or data may be received, sent, or stored upon different types of computer-accessible media or on similar media separate from the system memory 1710 or the computer system 1700. The computer system 1700 is described as implementing at least some of the functionality of functional blocks of previous Figures.

In one embodiment, the I/O interface 1715 may be configured to coordinate I/O traffic between the processor 1705, the system memory 1710, and any peripheral devices in the device, including the network interface 1720 or other peripheral interfaces, such as the input/output devices 1725. In some embodiments, the I/O interface 1715 may perform any necessary protocol, timing or other data transformations to convert data signals from one component (e.g., the system memory 1710) into a format suitable for use by another component (e.g., the processor 1705). In some embodiments, the I/O interface 615 may include support for devices attached through various types of peripheral buses, such as a variant of the Peripheral Component Interconnect (PCI) bus standard or the Universal Serial Bus (USB) standard, for example. In some embodiments, the function of the I/O interface 1715 may be split into two or more separate components, such as a north bridge and a south bridge, for example. Also, in some embodiments some or all of the functionality of the I/O interface 1715, such as an interface to the system memory 1710, may be incorporated directly into the processor 1705.

The network interface 1720 may be configured to allow data to be exchanged between the computer system 1700 and other devices attached to the network 105 (e.g., agent devices) or between nodes of the computer system 1700. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 1720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 1725 may, in some embodiments, include one or more display terminals, keyboards, keypads, touchpads, scanning devices, voice, or optical recognition devices, or any other devices suitable for entering or accessing data by one or more the computer systems 1700. Multiple input/output devices 1725 may be present in the computer system 1700 or may be distributed on various nodes of the computer system 1700. In some embodiments, similar input/output devices may be separate from the computer system 1700 and may interact with one or more nodes of the computer system 1700 through a wired or wireless connection, such as over the network interface 1720.

As shown in FIG. 17, the memory 1710 may include program instructions 1730, which may be processor-executable to implement any element or action, as described herein. In one embodiment, the program instructions may implement at least a portion of methods described herein, such as the methods illustrated by FIG. 17. In other embodiments, different elements and data may be included. Note that the data storage 1735 may include any data or information, as described herein.

Those skilled in the art will appreciate that the computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computer system 1700 may be transmitted to the computer system 1700 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM), ROM, or the like. In some embodiments, a computer-accessible medium may include transmission media or signals such as electrical, electromagnetic, or digital signals, conveyed via a communication medium such as network and/or a wireless link.

Thus, the disclosure provides, among other things, a system for intelligent display terminal operations, including an intelligent display terminal. Various features and advantages of the disclosure are set forth in the following claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A display terminal, comprising:
a display screen;
an actuator configured to rotate the display screen about an axis that is normal to the display screen; and
at least one processor configured to:
receive, via a network interface, display data from an electronic device,
modify the display data to form modified display data based on at least one of a display data attribute, an electronic device attribute, or an axial orientation of the display screen,
generate an image for display on the display screen using the modified display data,
receive, via the network interface, orientation data indicating an orientation of an electronic device display screen of the electronic device, and
generate a rotation signal to command the actuator to rotate the display screen about the axis to match the orientation of the electronic device display screen.

2. The display terminal of claim 1, wherein the display data is used to generate an original image on an electronic device display screen, and wherein the image comprises an image size change from the original image, a horizontal image pixel density change from the original image, a vertical image pixel density change from the original image, an image orientation change from the original image, an image brightness change from the original image, an image clarity change from the original image, an image color change from the original image, or an image placement change on the display screen relative to a placement of the original image on the electronic device display screen.

3. The display terminal of claim 1, wherein the at least one processor is further configured to receive a user input via the network interface or via a user interface of the display terminal to change one or more of an image size of the image, a horizontal image pixel density of the image, a vertical image pixel density of the image, an orientation of the image, a brightness of the image, a clarity of the image, a color of the image, or a placement of the image on the display screen.

4. The display terminal of claim 1, wherein the electronic device attribute comprises at least one of an electronic device type providing the display data, an electronic device orientation, one or more operating capabilities of the electronic device providing the display data, a distance of the electronic device from the display terminal, or an electronic device communication medium with the network interface, and wherein the display data attribute comprises at least one of a display data presentation characteristic or a display data type.

5. The display terminal of claim 1, wherein:
the electronic device is a first electronic device;
the display data is a first display data;
the display data attribute is a first display data attribute;
the electronic device attribute is a first electronic device attribute;
the modified display data is a first modified display data;
the image is a first image; and
the at least one processor is further configured to:
receive, via the network interface, second display data from a second electronic device,
modify the second display data to form second modified display data based on a second display data attribute, a second electronic device attribute, and the axial orientation of the display screen,
divide the display screen into a first section and a second section, and
generate a second image for display on the second section of the display screen using the second modified display data, wherein the first image is generated for display on the first section of the display screen using the first modified data.

6. The display terminal of claim 1, wherein:
the modified display data is oriented to define a position, and
when the electronic device display screen is rotated in a first direction, the at least one processor rotates the modified display data in a second direction that is opposite the first direction to maintain the modified display data in the position.

7. The display terminal of claim 1, wherein the at least one processor is further configured to:
detect, via a camera, whether a viewer viewing the display screen is squinting; and
modify the display data to form the modified display data based on the squinting of the viewer.

8. A method implemented by one or more processors of a display terminal coupled to an actuator, the method comprising:
receiving, by the one or more processors, display data from an electronic device via a network interface;
modifying, by the one or more processors, the display data to form modified display data based on at least one of a display data attribute, an electronic device attribute, or an axial orientation of a display screen of the display terminal;
generating, by the one or more processors, an image for display on the display screen of the display terminal using the modified display data;
receiving, via the network interface, orientation data indicating an orientation of an electronic device display screen; and
generating a rotation signal to command the actuator to rotate the display screen about an axis that is normal to the display screen to match the orientation of the electronic device display screen.

9. The method of claim 8, wherein the display data is used to generate an original image on the electronic device display screen, and wherein the image comprises an image size change from the original image, a horizontal image pixel density change from the original image, a vertical image pixel density change from the original image, an image orientation change from the original image, an image brightness change from the original image, or an image placement change on the display screen relative to a placement of the original image on the electronic device display screen.

10. The method of claim 8, further comprising:
receiving, by the one or more processors, a user input via the network interface or via a user interface of the display terminal to change one or more of an image size of the image, a horizontal image pixel density of the image, a vertical image pixel density of the image, an orientation of the image, a brightness of the image, a clarity of the image, a color of the image, or a placement of the image on the display screen.

11. The method of claim 8, wherein the electronic device attribute comprises at least one of an electronic device type providing the display data, an electronic device orientation, one or more operating capabilities of the electronic device providing the display data, a distance of the electronic device from the display terminal, or an electronic device communication medium with the network interface, and wherein the display data attribute comprises at least one of a display data presentation characteristic or a display data type.

12. The method of claim 8, wherein:
the electronic device is a first electronic device;
the display data is a first display data;
the display data attribute is a first display data attribute;
the electronic device attribute is a first electronic device attribute;
the modified display data is a first modified display data;
the image is a first image; and
the method further comprises:
receiving, by the one or more processors, second display data from a second electronic device via the network interface,
modifying, by the one or more processors, the second display data to form second modified display data based on a second display data attribute, a second electronic device attribute, and the axial orientation of the display screen,
dividing, by the one or more processors, the display screen into a first section and a second section, and
generating, by the one or more processors, a second image for display on the second section of the display screen using the second modified display data, wherein the first image is generated for display on the first section of the display screen using the first modified display data.

13. The method of claim 8, further comprising:
detecting, by the one or more processors, one or more facial features of a viewer viewing the display screen via a camera; and wherein modifying, by the one or more processors, the display data to form the modified display data further comprises modifying, by the one or more processors, the display data to form the modified display data based on the one or more facial features of the viewer viewing the display screen.

* * * * *